United States Patent
Kawano et al.

(10) Patent No.: US 8,429,733 B2
(45) Date of Patent: Apr. 23, 2013

(54) AUTHENTICATION SYSTEM, TERMINAL AND INFORMATION PROCESSING DEVICE, HAVING FUNCTION OF PERFORMING STABLE AUTHENTICATION

(75) Inventors: Kyoya Kawano, Osaka (JP); Hideto Hayasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 549 days.

(21) Appl. No.: 12/461,581

(22) Filed: Aug. 17, 2009

(65) Prior Publication Data

US 2010/0071047 A1 Mar. 18, 2010

(30) Foreign Application Priority Data

Aug. 19, 2008 (JP) .................. 2008-210246

(51) Int. Cl.
*G06F 7/04* (2006.01)
(52) U.S. Cl.
USPC ............... 726/9; 726/5; 455/406; 455/407; 455/408; 455/409; 455/411
(58) Field of Classification Search ............... 726/9, 17; 455/406–411; 235/375, 380, 492
See application file for complete search history.

(56) References Cited

U.S. PATENT DOCUMENTS 7,254,418 B2 * 8/2007 Iwasaki .................. 455/558
2004/0236964 A1 * 11/2004 Haverinen ................. 713/201
2008/0261562 A1 * 10/2008 Jwa et al. ................... 455/411
2009/0239502 A1 * 9/2009 Dempo et al. ............. 455/411
2009/0313689 A1 * 12/2009 Nystrom et al. ................ 726/9

FOREIGN PATENT DOCUMENTS

| JP | 2003-303061 | | 10/2003 |
| JP | 2006172501 | A | 6/2006 |
| JP | 2006268383 | A | 10/2006 |
| WO | WO-02-084548 | | 10/2002 |

* cited by examiner

*Primary Examiner* — Taghi Arani
*Assistant Examiner* — Jason Lee
(74) *Attorney, Agent, or Firm* — Edwards Wildman Palmer LLP; David G. Conlin; Stephen D. LeBarron

(57) ABSTRACT

To provide an authentication system allowing stable determination as to whether a user is a registered user while saving user's trouble, an information processing device capable of data communication with a plurality of image forming apparatuses extracts an image forming apparatus connected to an IC card reader from the plurality of image forming apparatuses, based on reply signals transmitted from the plurality of image forming apparatuses, and transmits user account information of registered users to the extracted image forming apparatus. The image forming apparatus connectable to the IC card reader performs, if it is determined that the IC card reader is connected to the image forming apparatus, the authentication process based on the user account information of registered users received from the information processing device and on the information read by the IC card reader.

9 Claims, 11 Drawing Sheets

AUTHENTICATION SYSTEM, TERMINAL AND INFORMATION PROCESSING DEVICE, HAVING FUNCTION OF PERFORMING STABLE AUTHENTICATION

CROSS-REFERENCE TO RELATED APPLICATION

This nonprovisional application claims priority under 35 U.S.C. §119(a) on Patent Application No. 2008-210246 filed in Japan on Aug. 19, 2008, the entire contents of which are hereby incorporated by reference.

BACKGROUND OF THE INVENTION

1. Field of the Invention

The present invention relates to an authentication system including an information processing device and a terminal performing data communication through a network, for determining whether or not a user is a registered user and, more specifically, to an authentication system in which the terminal performs an authentication process based on identification information transmitted from the information processing device.

2. Description of the Background Art

Recently, various systems including a plurality of image forming apparatuses and an information processing device performing data communication with the plurality of image forming apparatuses through a network have been proposed.

By way of example, Japanese Patent Laying-Open No. 2003-303061 (hereinafter referred to as "'061 application") discloses an image forming system, in which an image forming apparatus transmits original job setting information that it used to a server; the server stores the received original job setting information and a piece of job setting information as a result of data processing of the original job setting information, and transmits the piece of job setting information to the image forming apparatus in response to a request from the image forming apparatus; and the image forming apparatus performs a prescribed image forming process based on the received piece of job setting information. According to the technique disclosed in '061 application, data processing and the process of storing the original job setting information and the piece of job setting information are performed by the server, so that the load on the image forming apparatus is alleviated.

In order to prevent improper use of the image forming apparatus by an ill-intended third party, an authentication system has become popular, which system determines whether the user of an image forming apparatus is a registered user, or not a registered user but, for example, a third party who may abuse the apparatus. Such an authentication system has an information reading device connected to the image forming apparatus, for reading identification information for identifying a user. As the information reading device, an IC (Integrated Circuit) card reader capable of reading user account information as the identification information from an IC card is often used. The image forming apparatus performs the authentication process based on the user account information read by the IC card reader and the user account information of registered users stored in advance, and performs the prescribed process based on the result.

In the authentication system, in order to alleviate the load on image forming apparatus, it may be possible to apply the technique of '061 application. Specifically, the image forming apparatus transmits the user account information read by the IC card reader to the information processing device; the information processing device performs the authentication process based on the received user account information and the user account information of registered users stored in advance, and transmits the result of authentication process to the image forming apparatus. In such an authentication system, if a communication trouble occurs, for example, due to excessive access to the information processing device and data communication between the image forming apparatus and the information processing device should fail, authentication process becomes impossible, and even a registered user will not be able to use the image forming apparatus.

If the authentication process is to be done by the image forming apparatus, it is necessary for the user to have the user account information of the registered users stored in advance in every image forming apparatus, which involves a time-consuming, troublesome work of the user.

SUMMARY OF THE INVENTION

An object of the present invention is to provide an authentication system, a terminal and an information processing apparatus allowing stable determination as to whether or not the user is a registered user while saving user's trouble.

According to an aspect, the present invention provides an authentication system including a plurality of terminals and an information processing device performing data communication with the plurality of terminals through a network. The information processing device includes: a storage unit storing identification information for identifying whether or not a user is a registered user; an inquiring unit making an inquiry to each of the plurality of terminals about whether or not an information reading device for reading information from an information storage medium is connected to said each of the plurality of terminals; a reply signal receiving unit receiving reply signals from the plurality of terminals, the reply signals being transmitted in response to the inquiry; an extracting unit extracting a terminal to which the information reading device is connected, from the plurality of terminals, based on the received reply signals; and a first identification information transmitting unit transmitting the identification information stored in the storage unit to the extracted terminal. At least one of the plurality of terminals includes: an inquiry receiving unit receiving the inquiry transmitted from the information processing device; a reply signal transmitting unit, responsive to reception of the inquiry by the inquiry receiving unit, for determining whether or not the information reading device is connected to the terminal, forming the reply signal in accordance with the result of determination and transmitting the signal to the information processing device; a first identification information receiving unit receiving and storing in a prescribed identification information storage unit, the identification information transmitted from the information processing device, if it is determined that the information reading device is connected to the terminal; a determining unit determining whether or not the user is a registered user, based on the identification information stored in the identification information storage unit and on the information read by the information reading device; and a control unit performing a prescribed process based on a result of determination by the determining unit.

As described above, the information processing device capable of data communication with a plurality of terminals extracts, based on reply signals to an inquiry as to whether an information reading device is connected or not, transmitted from the plurality of terminals, a terminal having the information reading device connected thereto, and transmits the identification information for identifying whether or not the user is a registered user to the extracted terminal. The terminal connectable to the information reading device determines, when it is determined that the information reading device is connected to the terminal, whether or not the user is a registered user, based on the identification information received from the information processing device and stored in the identification information storage unit and the information read by the information reading device. Therefore, as compared with the approach in which identification information is transmitted to each and every terminal that performs data communication through the network, the number of destinations to which the identification information is transmitted can be reduced and, therefore, the load on the information processing device related to the process of transmitting the identification information can be reduced. Further, it is possible to have the identification information received at one time by all the terminals having information reading devices connected thereto. Therefore, as regards the terminals having the information reading devices connected thereto, it becomes unnecessary for the user to have the identification information stored in advance in each and every terminal. Thus, the trouble required for storing the identification information can be saved. Further, it is the terminal that determines whether or not the user is a registered user. Therefore, even if data communication is impossible because of some communication trouble between the terminal and the information processing device, stable determination is possible as to whether the user is a registered user or not.

Preferably, the first identification information transmitting unit transmits the identification information stored in the storage unit only to the terminal extracted by the extracting unit, among the plurality of terminals.

Therefore, as compared with the approach in which identification information is transmitted to each and every terminal that performs data communication through the network, the number of destinations to which the identification information is transmitted can be reduced and, therefore, the load on the information processing device required for the process of transmitting the identification information can surely be reduced.

More preferably, in the information reading device, a prescribed reading method for reading information from the information recording medium is set in advance; the inquiring unit includes a method inquiring unit for making an inquiry to of each of the plurality of terminals about whether or not an information reading device reading information from the information recording medium in accordance with the prescribed reading method is connected to said each of the plurality of the terminals; and the reply signal transmitting unit includes a transmitting unit, responsive to reception of the inquiry by the inquiry receiving unit, for determining whether or not the information reading device reading information from the information recording medium in accordance with the prescribed reading method is connected to the terminal, forming the reply signal in accordance with the result of determination and transmitting the signal to the information processing device.

As described above, the information processing device capable of data communication with a plurality of terminals extracts, based on reply signals transmitted from the terminals in response to an inquiry as to whether an information reading device reading information from the information recording medium in accordance with a prescribed reading method is connected or not, a terminal having the information reading device reading information in accordance with the prescribed reading method from the information recording medium connected thereto, and transmits the identification information for identifying whether or not the user is a registered user to the extracted terminal. Therefore, as compared with the approach in which identification information is transmitted to each and every terminal that performs data communication through the network, the number of destinations to which the identification information is transmitted can further be reduced and, therefore, the load on the information processing device related to the process of transmitting the identification information can further be reduced. Further, it is possible to have the identification information received at one time by all the terminals having information reading devices reading information in accordance with the prescribed reading method from the information recording medium connected thereto. Therefore, as regards the terminals to which the information reading devices reading information in accordance with the prescribed reading method from the information recording medium are connected, it becomes unnecessary for the user to have the identification information stored in advance in each and every terminal. Thus, the trouble required for storing the identification information can be saved.

More preferably, the information processing device further includes an elapsed time determining unit determining whether or not a predetermined prescribed time period has passed from transmission of the identification information; and the first identification information transmitting unit includes a first re-transmitting unit for re-transmitting, if it is determined by the elapsed time determining unit that the predetermined prescribed time period has passed from transmission of the identification information, the identification information stored in the storage unit to the extracted terminal.

As described above, the first identification information transmitting unit includes the first re-transmitting unit re-transmitting, when it is determined by elapsed time determining unit that a predetermined time period has passed from the transmission of identification information, the identification information again to the extracted terminal. Therefore, even when data communication temporarily fails because of some communication trouble between the terminal and the information processing device, the identification information can reliably be received by the terminal to which the information reading device is connected, and determination as to whether the user is a registered user or not can be made more reliably. Further, even if the identification information is changed, it is possible for the terminal to determine whether or not the user is a registered user based on the latest identification information and, therefore, more reliable determination is possible.

More preferably, at least one of the plurality of terminals further includes a distribution acknowledgment signal transmitting unit transmitting a distribution acknowledgment signal, notifying successful reception of the identification information, to the information processing device; the information processing device further includes a distribution acknowledgment signal receiving unit receiving the distribution acknowledgment signal; and the first identification information transmitting unit further includes a second re-transmitting unit for re-transmitting, if it is determined by the elapsed time determining unit that the predetermined prescribed time period has passed from transmission of the identification information, the identification information stored in the storage unit to the extracted terminal that has not yet transmitted the distribution acknowledgment signal.

As described above, the first identification information transmitting unit further includes the second re-transmitting unit re-transmitting, when it is determined by elapsed time determining unit that a predetermined prescribed time period has passed from the transmission of identification information, the identification again to the extracted terminal from which the distribution acknowledgment signal notifying successful reception of the identification information has not been transmitted. Therefore, the identification information can be received even by a terminal that could not receive the identification information because of temporary failure of data communication caused by some communication trouble between the terminal and the information processing device, and determination as to whether the user is a registered user or not can be made more reliably. Further, as compared with an approach in which the identification information is transmitted to an extracted terminal every time the predetermined prescribed time period elapsed from the transmission of identification information, the number of destinations to which the identification information is transmitted can be reduced and, therefore, the load required for transmitting the identification information can further be reduced.

More preferably, the storage unit includes a distribution log information storage unit for further storing distribution destination information indicating a terminal as a transmission destination of the identification information, distribution date and time information indicating date and time of transmission of the identification information, and distribution status information indicating whether or not the terminal has successfully received the identification information, related to each other as distribution log information.

As described above, the distribution log information is stored and, therefore, determination by the elapsed time determining unit as to whether the predetermined time has passed from the transmission of identification information or not, and the transmission of identification information by the first identification information transmitting unit to the extracted terminal from which the distribution acknowledgment signal notifying successful reception of the identification information has not been transmitted, can be done with higher reliability. Therefore, the identification information can be received even by a terminal that could not receive the identification information because of temporary failure of data communication caused by some communication trouble between the terminal and the information processing device, and determination as to whether the user is a registered user or not can be made more reliably.

More preferably, the authentication system further includes an information terminal performing data communication with the plurality of terminals and the information processing device through a network; wherein the information terminal includes a second identification information transmitting unit transmitting the identification information to the information processing device; the information processing device further includes a second identification information receiving unit receiving the identification information transmitted from the information terminal; and the storage unit stores the identification information received by the second identification information receiving unit.

Therefore, it becomes possible for the information processing device to obtain the identification information from the information terminal as an external terminal performing data communication through the network and, hence, the process for storing and changing the identification information becomes easier. This leads to improved convenience for the user.

According to another aspect, the present invention provides a terminal, connectable to an information reading device reading information from an information recording medium, and performing data communication with an information processing device through a network, including: an inquiry receiving unit receiving an inquiry as to whether or not the information reading device is connected to the terminal, transmitted from the information processing device; a reply signal transmitting unit, responsive to reception of the inquiry by the inquiry receiving unit, for determining whether or not the information reading device is connected to the terminal, forming the reply signal in accordance with a result of determination and transmitting the signal to the information processing device; a first identification information receiving unit for receiving and storing in a prescribed identification information storage unit, if it is determined that the information reading device is connected to the terminal, identification information for identifying whether or not a user is a registered user, transmitted from the information processing device in response to the reply signal; a determining unit determining, if it is determined that the information reading device is connected to the terminal, whether or not a user is a registered user, based on the identification information stored in the identification information storage unit and the information read by the information reading device; and a control unit performing a prescribed process based on a result of determination by the determining unit.

As described above, the terminal connectable to the information reading device determines, when it is determined that the information reading device is connected to the terminal, whether or not the user is a registered user, based on the identification information received from the information processing device and stored in the identification information storage unit and the information read by the information reading device. Therefore, even if data communication is impossible because of some communication trouble between the terminal and the information processing device, stable determination is possible as to whether the user is a registered user or not. Further, it is possible to have the identification information received at one time by all the terminals having information reading devices connected thereto. Therefore, as regards the terminals to which the information reading devices are connected, it becomes unnecessary for the user to have the identification information stored in advance in each and every terminal. Thus, the trouble required for storing the identification information can be saved.

According to a still further aspect, the present invention provides an information processing device, performing data communication through a network with a plurality of terminals including a terminal to which an information reading device reading information from an information recording medium is connected, including: a storage unit storing identification information for identifying whether or not a user is a registered user; an inquiring unit making an inquiry to the plurality of terminals about whether or not the information reading device is connected to the terminals; a reply signal receiving unit receiving reply signals transmitted from the plurality of terminals, the reply signals being transmitted in response to the inquiry; an extracting unit extracting a terminal to which the information reading device is connected, from the plurality of terminals, based on the received reply signals; and a first identification information transmitting unit transmitting the identification information stored in the storage unit, to the extracted terminal.

As described above, the information processing device capable of data communication with a plurality of terminals extracts, based on reply signals to an inquiry as to whether an information reading device is connected or not, transmitted from the plurality of terminals, a terminal having the information reading device connected thereto, and transmits the identification information for identifying whether or not the user is a registered user to the extracted terminal. Therefore, as compared with the approach in which identification information is transmitted to each and every terminal that performs data communication through the network, the number of destinations to which the identification information is transmitted can be reduced and, therefore, the load on the information processing device related to the process of transmitting the identification information can be reduced. Further, it is possible to have the identification information received at one time by all the terminals having information reading devices connected thereto. Therefore, as regards the terminals to which the information reading devices are connected, it becomes unnecessary for the user to have the identification information stored in advance in each and every terminal. Thus, the trouble required for storing the identification information can be saved.

According to the present invention, the information processing device capable of data communication with a plurality of terminals extracts, based on reply signals to an inquiry as to whether an information reading device is connected or not, transmitted from the plurality of terminals, a terminal having the information reading device connected thereto, and transmits the identification information for identifying whether or not the user is a registered user to the extracted terminal. The terminal connectable to the information reading device determines, when it is determined that the information reading device is connected to the terminal, whether or not the user is a registered user, based on the identification information received from the information processing device and stored in the identification information storage unit and the information read by the information reading device. Therefore, as compared with the approach in which identification information is transmitted to each and every terminal that performs data communication through the network, the number of destinations to which the identification information is transmitted can be reduced and, therefore, the load on the information processing device related to the process of transmitting the identification information can be reduced. Further, it is possible to have the identification information received at one time by all the terminals having information reading devices connected thereto. Therefore, as regards the terminals to which the information reading devices are connected, it becomes unnecessary for the user to have the identification information stored in advance in each and every terminal. Thus, the trouble required for storing the identification information can be saved. Further, it is the terminal that determines whether or not the user is a registered user. Therefore, even if data communication is impossible because of some communication trouble between the terminal and the information processing device, stable determination is possible as to whether the user is a registered user or not.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
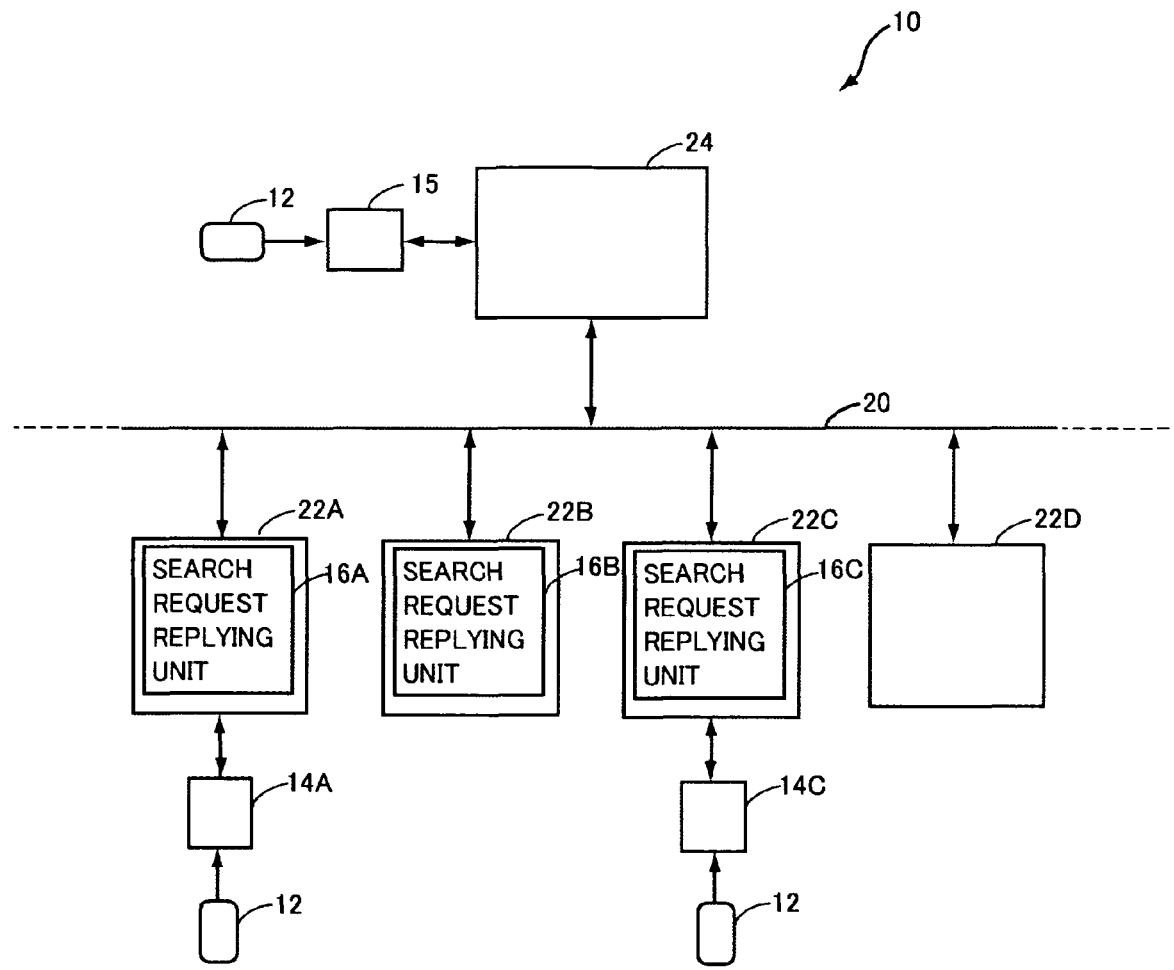
FIG. 1 is a block diagram schematically showing a configuration of the authentication system in accordance with the first embodiment of the present invention.

In the following description and in the drawings, the same components are denoted by the same reference characters and the same names. Their functions are also the same. Therefore, detailed description thereof will not be repeated each time.

First Embodiment

Referring to FIG. 1, an authentication system 10 includes a plurality of image forming apparatuses 22A to 22D, and an information processing device 24 performing data communication with image forming apparatuses 22A to 22D through a network 20 implemented by an LAN (Local Area Network) line.

To image forming apparatuses 22A and 22C, IC card readers 14A and 14C for reading user account information from an IC card 12 are connected. To information processing device 24, an IC card reader 15 for reading the user account information from IC card 12 is connected. The user account information refers to a piece of information for identifying an owner of IC card 12, indicating the name of the owner and, for example, a section to which he/she belongs. The user account information is used in an authentication process in which whether or not the user who is about to use image forming apparatus 22 is a registered user allowed to use image forming apparatus 22 is determined. In the present specification, each component corresponding to each of image forming apparatuses 22A to 22D will be distinguished by adding an alphabet corresponding to respective image forming apparatuses 22A to 22D as a suffix to the reference character, and when the component is generally described, it will be denoted by the reference character without any suffix.

A prescribed IC card standard is set beforehand in IC card readers 14A, 14C and 15. IC card readers 14A, 14C and 15 read the user account information from IC card 12 in accordance with the set IC card standards, and output read signals including the read information. Therefore, IC card readers 14A, 14C and 15 output normal read signals when they read the user account information from IC card 12 that supports the preset IC card standard. The IC card standard here refers to the standard defined by ISO/IEC 14443 for a proximity type IC card, ISO/IEC 10536 for a close coupling type IC card, ISO/IEC 15693 for the vicinity type IC card as international standards of non-contact type IC cards, Felica (Registered Trademark) or the like. In the present specification, individual IC card standard will be specified by adding an alphabet representing each IC card standard after the term "Type," and expressed such as "Type-A," or "Type-B." In the present embodiment, the IC card standard of Type-A is set beforehand for IC card readers 14A, 14C and 15, and a registered user has IC card 12 that supports Type-A.

In authentication system 10, information processing device 24 transmits the user account information of registered users, to image forming apparatuses 22A and 22C to which IC card readers 14A and 14C are connected. Image forming apparatuses 22A and 22C perform the authentication process based on the received user account information of the registered users and on the user account information read by IC card readers 14A and 14C, and execute a prescribed process in accordance with the result of authentication process.

<Hardware Configuration>

In the following, hardware configurations of image forming apparatuses 22A to 22D and information processing device 24 will be described.

[Image Forming Apparatus 22]

Figure 2:
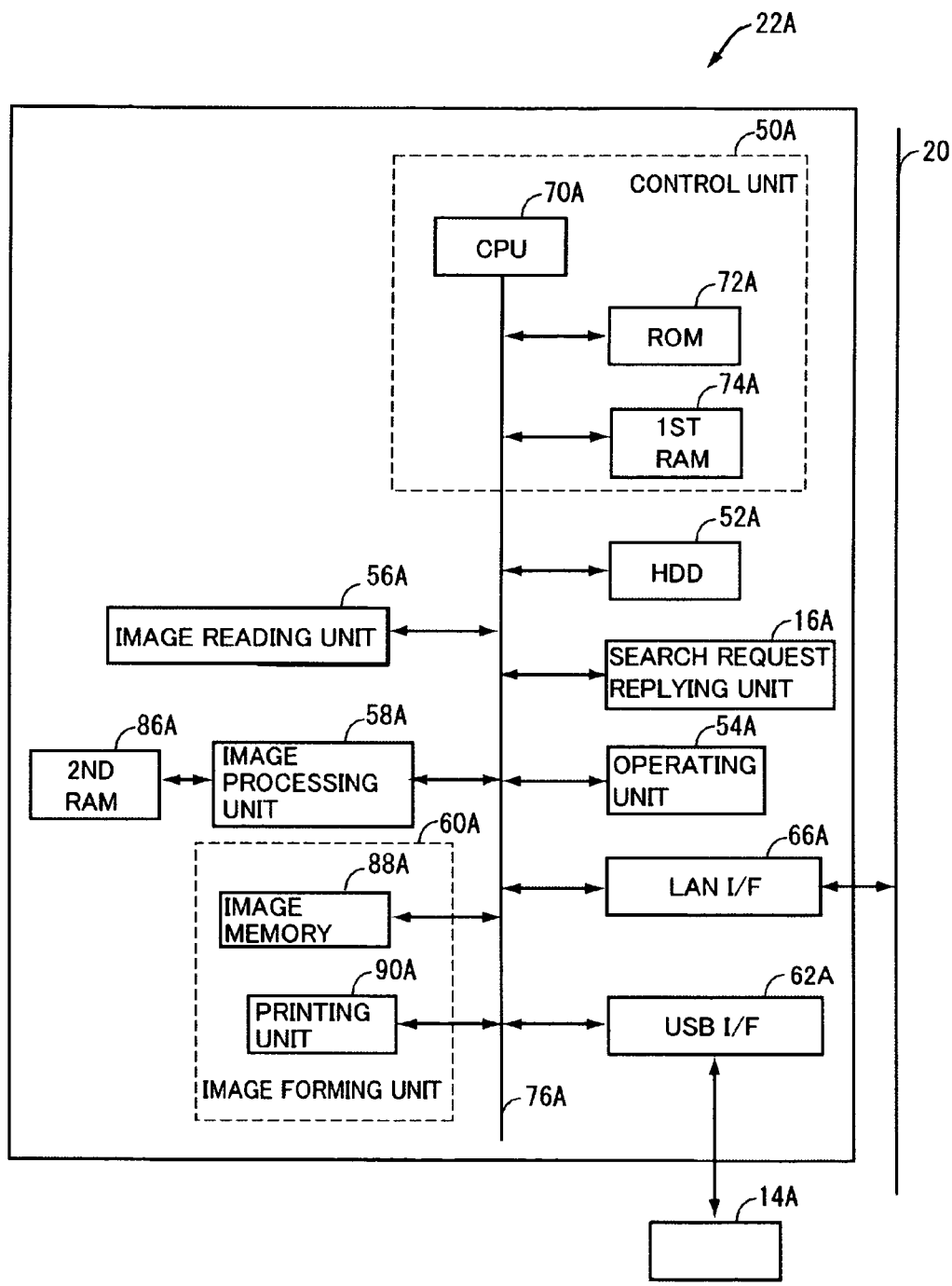
FIG. 2 is a block diagram showing a configuration of an image forming apparatus including a search request replying unit, having an IC card reader connected thereto.

Referring to FIG. 2, image forming apparatus 22A is, for example, an MFP (Multi-Function Printer) having a scanner function, a copy function, a facsimile function and a printer function. Image forming apparatus 22A includes a control unit 50A, an HDD (Hard Disk Drive) 52A, an operating unit 54A, an image reading unit 56A, an image processing unit 58A, an image forming unit 60A, an USB (Registered Trademark, Universal Serial Bus) interface (USB I/F) 62A, an LAN interface (LAN I/F) 66A and a search request replying unit 16A.

Control unit 50A is substantially a computer, including a CPU (Central Processing Unit) 70A, an ROM (Read-Only Memory) 72A, and a first RAM (Random Access Memory) 74A. A bus line 76A is connected to CPU 70A, and to bus line 76A, ROM 72A and the first RAM 74A are electrically connected. CPU 70A executes desired processes such as operations of various components of image forming apparatus 22A and communication with external equipment such as data processing device 24, by executing various computer programs in accordance with instructions from operating unit 54A and the like. The various computer programs mentioned above are stored beforehand in ROM 72A, and when a desired process is to be executed, the program is read from ROM 72A and transferred to the first RAM 74A. CPU 70A reads a program instruction from an address in the first RAM 74A designated by a value stored in a register called a program counter, not shown, in CPU 70A, and interprets the instruction. Further, CPU 70A reads data necessary for operation from an address designated by the read instruction, and executes an operation corresponding to the instruction on the data. The result of execution is also stored at an address designated by the instruction, such as a register in CPU 70A, HDD 52A or the first RAM 74A.

In the present embodiment, ROM 72A stores a computer program to cause image forming apparatus 22A to control and operate as a part of authentication system 10. The control structure of the computer program will be described later.

To bus line 76A, HDD 52A, operating unit 54A, image reading unit 56A, image processing unit 58A, image forming unit 60A, USB I/F 62A, LAN I/F 66A and search request replying unit 16A are further electrically connected.

HDD 52A includes a magnetic recording medium. HDD 52A provides a storage area for storing various data, including identification ID (Identification number) of image forming apparatus 22A, user account information of the registered users transmitted from information processing device 24, and image data input from image memory 88A. Here, the identification ID refers to an ID set uniquely for image forming apparatus 22A for identifying and distinguishing image forming apparatus 22A. In the present embodiment, an IP (Internet Protocol) address is used as the identification ID.

Operating unit 54A is formed by an input unit including a touch panel with various input'keys and the like for various inputs in accordance with a user instruction and the like, and a display unit such as a liquid crystal display (LCD), placed in an overlapping manner.

Image reading unit 56A includes an optical system including a document detection sensor and a CCD (Charge-Coupled Device) line sensor (both not shown). The document detection sensor forms, on the CCD line sensor, an image of a reflected light obtained by irradiating an image-bearing surface of a document placed on a platen (not shown) manually by the user or by an ADF (Automatic Document Feeder, not shown) with light from a light source (not shown). The CCD line sensor successively performs photo-electric conversion of the image formed by reflected light, and outputs the result as image data to an image memory 88A, which will be described later. Image reading unit 56A reads, using the document detection sensor, image information of the document placed on the platen at the time of copying or scanning a document, converts the read image information to electric signals by the CCD line sensor, and outputs the result as the image data to image memory 88A.

Image processing unit 58A includes an MPU (Micro Processing Unit, not shown). Image processing unit 58A performs prescribed image processing operations such as γ (gamma) correction and filtering, on the image data input from image reading unit 56A or from an external device to image memory 88A, and performs various processes such as compression and expansion, using a second RAM 86A as a dedicated memory. Image processing unit 58A further outputs image data subjected to such processes once to image memory 88A page by page, and then stores the image data in HDD 52A.

Image forming unit 60A includes image memory 88A and a printing unit 90A. Image memory 88A includes an RAM, and temporarily stores the image data page by page. In response to an instruction from control unit 50A or the like, image memory 88A successively reads image data to be transmitted to printing unit 90A from HDD 52A page by page and stores the data temporarily, and in synchronization with image formation by printing unit 90A, outputs the stored image data to printing unit 90A. In this manner, as the HDD 52A stores a plurality of image data and image memory 88A successively processes the image data page by page, even when there are a plurality of image data to be transmitted to printing unit 90A, it is possible to perform image forming operations quickly and efficiently.

Printing unit 90A includes a photoreceptor, a charger, an LSU (Laser Scanning Unit), a developer, a transfer unit, a cleaning unit, and a fixing unit (all not shown). Printing unit 90A further includes a manual feed tray and first and second paper feed trays (all not shown) that are detachably attached to image forming apparatus 22A. These paper feed trays are arranged from top to bottom in this order. These paper feed trays hold sheets of recording paper, and feed sheets of recording paper to a paper feeding unit (not shown) for feeding the recording paper. The manual feed tray is for allowing the user to set a desired sheet of recording paper. The first and second paper feed trays are to hold sheets of recording paper of different sizes. In response to an instruction from control unit 50A or the like, printing unit 90A forms an image based on the image data transmitted from image memory 88A, on the sheet of recording paper fed from any of the paper feed trays through the paper feeding unit.

USB I/F 62A is a Hot-Plug-supporting interface having a USB port. USB I/F 62A automatically recognizes an external device electrically connected to image forming apparatus 22A while the apparatus is in operation, through a USB cable. In image forming apparatus 22A, an IC card reader 14A is connected to USB I/F 62A. IC card reader 14A is an information reading device for reading the user account information included in IC card 12. When IC card 12 is inserted to a card insertion slot (not shown), IC card reader 14A reads user account information included in IC card 12 in accordance with Type-A as the preset IC card standard, and outputs a read signal including the read information, to control unit 50A.

Image forming apparatus 22A is connected to network 20 formed of LAN line, through LAN I/F 66A. Image forming apparatus 22A is capable of facsimile communication with a facsimile machine or the like connected to network 20, and capable of data communication with data processing device 24.

Search request replying unit 16A is actually realized by a program executed by CPU 70A. Search request replying unit 16A forms a reply signal including search reply data indicating whether IC card reader 14A is connected to image forming apparatus 22A or not and an identification ID of image forming apparatus 22A. In the present embodiment, 1 bit of data is used as the search reply data. Specifically, receiving a search request signal transmitted from information processing device 24, search request replying unit 16A reads the identification ID from HDD 52A and determines whether or not the IC card reader 14A is connected to USB I/F 62A. If it is determined that the IC card reader 14A is connected, it forms a reply signal including data "1" as a binary data indicating that IC card reader 14A is connected, and the read identification ID. If it is determined that IC card reader 14A is not connected, it forms a reply signal including data "0" as a binary data indicating that IC card reader 14A is not connected, and the read identification ID. The search request signal refers to a signal requesting transmission of a reply signal, which is transmitted from information processing device 24 to image forming apparatuses 22A to 22D. By transmitting search request signal to image forming apparatuses 22A to 22D, information processing device 24 inquires whether or not IC card reader 14 is connected to image forming apparatus 22.

A power source (not shown) is connected to each component of image forming apparatus 22A. Operations of various components in image forming apparatus 22A are realized when voltage is applied from the power source.

By the operations of various components mentioned above, image forming apparatus 22A executes any of various operation modes including a copy mode in which a document image is read and printed on a sheet of recording paper, a printer mode in which image data transmitted from an external device or the like is received and printed on a sheet of recording paper, a scanner mode in which a document image is read and image data is transmitted to an external device or the like and a FAX mode in which facsimile communication with a facsimile machine takes place, in accordance with an instruction given by an input operation by the user through operating unit 54A or an instruction from an external device or the like.

[Image Forming Apparatuses 22B to 22D]

Referring to FIG. 1, image forming apparatus 22B has the same configuration as image forming apparatus 22A except that IC card reader 14 is not connected. Image forming apparatus 22C has the same configuration as image forming apparatus 22A. Image forming apparatus 22D has the same configuration as image forming apparatus 22A except that IC card reader 14 is not connected, search request replying unit 16 is not included and ROM 72D does not store a computer program for controlling and operating image forming apparatus 22D as a part of authentication system 10.

[Information Processing Device 24]

Figure 3:
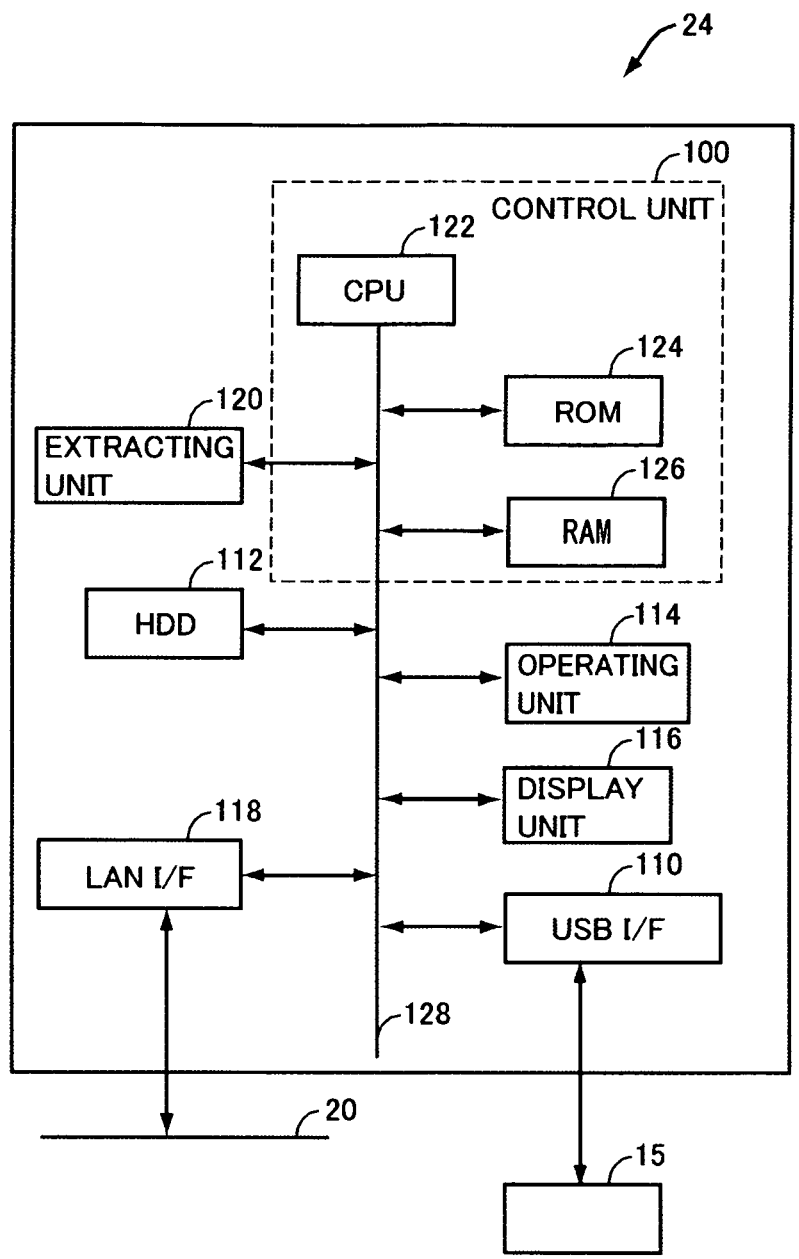
FIG. 3 is a block diagram showing a configuration of the information processing device.

Referring to FIG. 3, information processing device 24 is a server including a control unit 100, an USB I/F 110, an HDD 112, an operating unit 114, a display unit 116, an LAN I/F 118 and an extracting unit 120.

Control unit 100 is substantially a computer, including a CPU 122, an ROM 124 and an RAM 126. To CPU 122, a bus line 128 is connected, and to bus line 128, ROM 124 and RAM 126 are electrically connected. CPU 122 executes a desired process such as communication with an external device such as image forming apparatus 22 and operations of various components of information processing device 24, by executing various computer programs in accordance with an instruction from operating unit 114 or from an external device such as image forming apparatus 22. The various computer programs mentioned above are stored in advance in ROM 124, and when a desired process is executed, read from ROM 124 and transferred to RAM 126. CPU 122 reads a program instruction from an address in RAM 126 designated by a value stored in a register, which is referred to as a program counter, not shown, in CPU 122, and interprets the instruction. Further, CPU 122 reads data necessary for operation from an address designated by the read instruction, and executes an operation corresponding to the instruction on the data. The result of execution is also stored at an address designated by the instruction, in a register, for example, in CPU 122, HDD 112 and RAM 126.

In the present embodiment, ROM 124 stores a computer program for controlling and operating information processing device 24 as a part of authentication system 10. The control structure of the computer program will be described later. ROM 124 further stores a registration program for executing a process of registering user account information of registered users. The registration program is activated when, for example, a user authorized to execute the program performs a prescribed authentication using, for example, a password.

To bus line 128, HDD 112, USB I/F 110, operating unit 114, display unit 116, LAN I/F 118 and extracting unit 120 are further electrically connected.

USB I/F 110 is a Hot-Plug-supporting interface having a USB port. USB I/F 110 automatically recognizes an external device electrically connected to information processing device 24 while the apparatus is in operation, through a USB cable. In information processing device 24, an IC card reader 15 is connected to USB I/F 110. IC card reader 15 is an information reading device for reading user account information included in IC card 12. After a prescribed authentication is done by an authorized user and the registration program is activated, when an IC card 12 recording user account information as the object of registration is inserted to a card insertion slot (not shown), IC card reader 15 reads the user account information included in IC card 12, in accordance with Type-A as the preset IC card standard. Then, the read user account information is stored in HDD 112. Specifically, it is possible only by the authorized user allowed to perform prescribed authentication to have the IC card 12, which records the user account information of registered user as the user account information of the object of registration, read by IC card reader 15 and to have the contents stored in HDD 112.

HDD 112 includes a magnetic recording medium. HDD 112 provides a storage area for storing various data, including the user account information of the registered user read by IC card reader 15.

Operating unit 114 is implemented by a keyboard as an input device allowing various inputs in accordance with a user instruction, character input and the like. Display unit 116 is a display device formed of a liquid crystal display or the like, for displaying result of processing by information processing device 24 and the like. Operating unit 114 and display unit 116 are connected to bus line 128 through an interface (not shown).

Information processing device 24 is connected to network 20 formed of a LAN line, through LAN I/F 118. Information processing device 24 is capable of data communication with image forming apparatus 22 connected to network 20.

Extracting unit 120 is actually realized by a program executed by CPU 122. Extracting unit 120 extracts, based on the reply signals received from image forming apparatuses 22, an image forming apparatus 22 to which IC card reader 14 is connected, from among the plurality of image forming apparatuses 22 connected to network 20, and reads a corresponding identification ID from the reply signal. Specifically, extracting unit 120 extracts, from the received reply signals, one that includes data "1" indicating connection of IC card reader 14, and reads identification ID of image forming apparatus 22 included in the extracted reply signal.

To components of information processing device 24, a power source (not shown) is connected. The operation of each component of information processing device 24 is realized when a voltage is applied from the power source.

<Software Configuration>

[Image Forming Apparatuses 22A to 22C]

As described above, the computer program stored in ROM 72 of image forming apparatuses 22A to 22C is programmed for controlling and operating image forming apparatuses 22A to 22C as a part of authentication system 10. The program is a storage program for performing a process for storing user account information of registered users. The program is executed through a signal forming function, a determining function, a storage function and the like realized by cooperation between hardware and the computer program, by a computer including a CPU 70 substantially constituting control unit 50, controlling operations of image forming apparatuses 22A to 22C in accordance with the computer program described above. The signal forming function refers to the function of forming the reply signal. The determining function refers to the function of performing various determination processes as will be described later, including a process for determining whether or not the search request signal has been received. The storage function refers to a function of storing the received user account information of registered users in HDD 52.

The storage program for realizing authentication system 10 in image forming apparatuses 22A to 22C is activated when power of image forming apparatuses 22A to 22C are turned on. At the time of activation of image forming apparatuses 22A to 22C, image forming apparatuses 22A and 22C are set to an unusable state by control unit 50. Image forming apparatus 22B is set to a ready-to-use state by control unit 50, and on the display unit of operating unit 54, a setting image is displayed, allowing the user to input an instruction related to various processes performed by image forming apparatus 22B. The program ends when power of image forming apparatuses 22A to 22C is turned off, for example, by the user.

Figure 4:
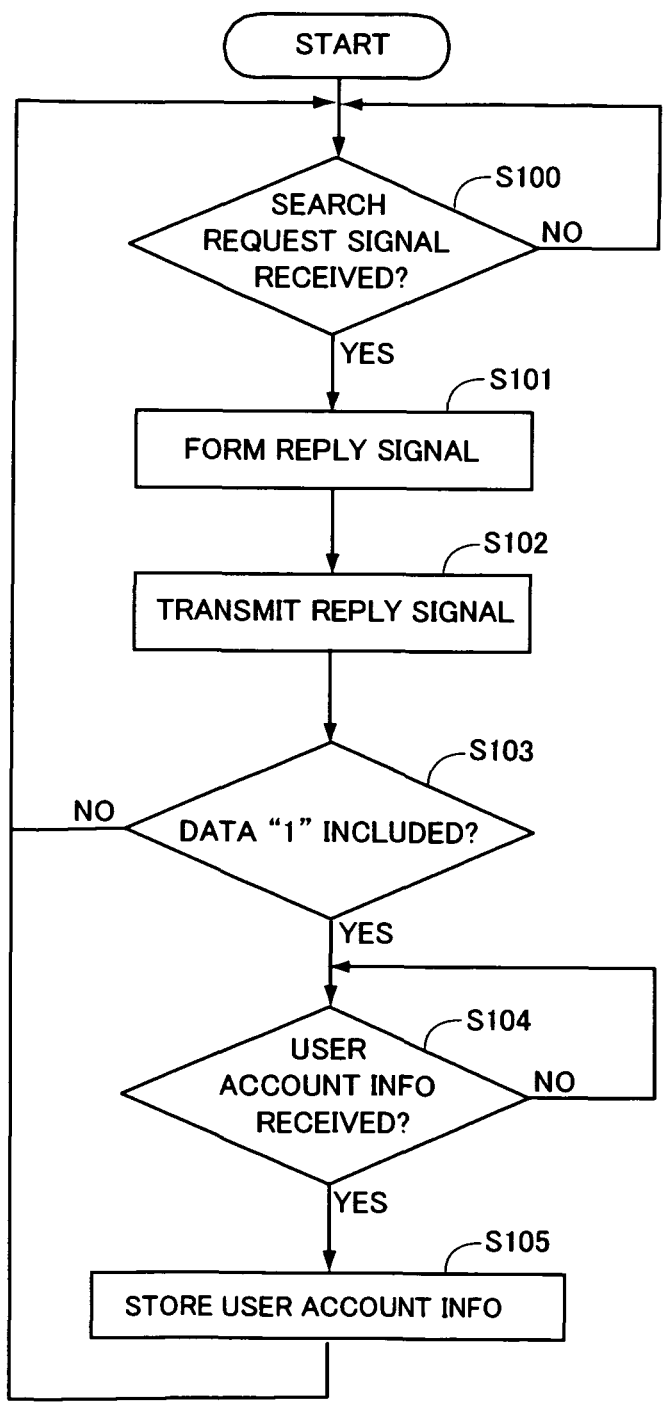
FIGS. 4 and 5 show, in the form of flowcharts, a program structure for realizing the authentication system in the image forming apparatus.

Referring to FIG. 4, the storage program includes: a step 100 of monitoring LAN I/F 66 and waiting for a reception of search request signal from information processing device 24; a step 101 executed if it is determined at step 100 that the search request signal has been received (YES), of forming a reply signal including the search reply data indicating whether or not IC card reader 14 is connected to each of image forming apparatuses 22A to 22C and the identification ID of each of image forming apparatuses 22A to 22C; a step 102 of transmitting the formed reply signal to information processing device 24 through LAN I/F 66 and network 20; and a step 103 of determining whether or not the formed reply signal includes data "1" indicating connection of IC card reader 14, and branching control flow depending on the result of determination. If it is determined at step 103 that data "1" is not included (NO), control returns to step 100.

The program further includes a step 104 executed if it is determined at step 103 that data "1" is included (YES), of monitoring LAN I/F 66 and waiting until LAN I/F 66 receives the user account information of registered users from information processing device 24.

The program further includes a step 105 executed if it is determined at step 104 that the user account information of registered users has been received (YES), of storing the received user account information of the registered users in HDD 52.

[Image Forming Apparatuses 22A, 22C]

As described above, the computer program stored in ROM 72 of image forming apparatuses 22A and 22C is programmed for controlling and operating image forming apparatuses 22A and 22C as a part of authentication system 10. The program is an authentication program for performing the authentication process. The program is executed through a determining function, an operation control function and the like realized by cooperation between hardware and the computer program, by a computer including a CPU 70 substantially constituting control unit 50, controlling operations of image forming apparatuses 22A and 22C in accordance with the computer program described above. The determining function refers to a function of performing various determination processes as will be described later, including the process for determining whether or not the user who is about to use image forming apparatus 22A or 22C is a registered user, and the operation control function refers to a function of setting image forming apparatuses 22A and 22C to the ready-to-use state or unusable state.

The authentication program for realizing the authentication system 10 in image forming apparatuses 22A and 22C is activated when power of image forming apparatuses 22A and 22C is turned on. The program ends when the power of image forming apparatuses 22A and 22C is turned off, for example, by the user.

Figure 5:
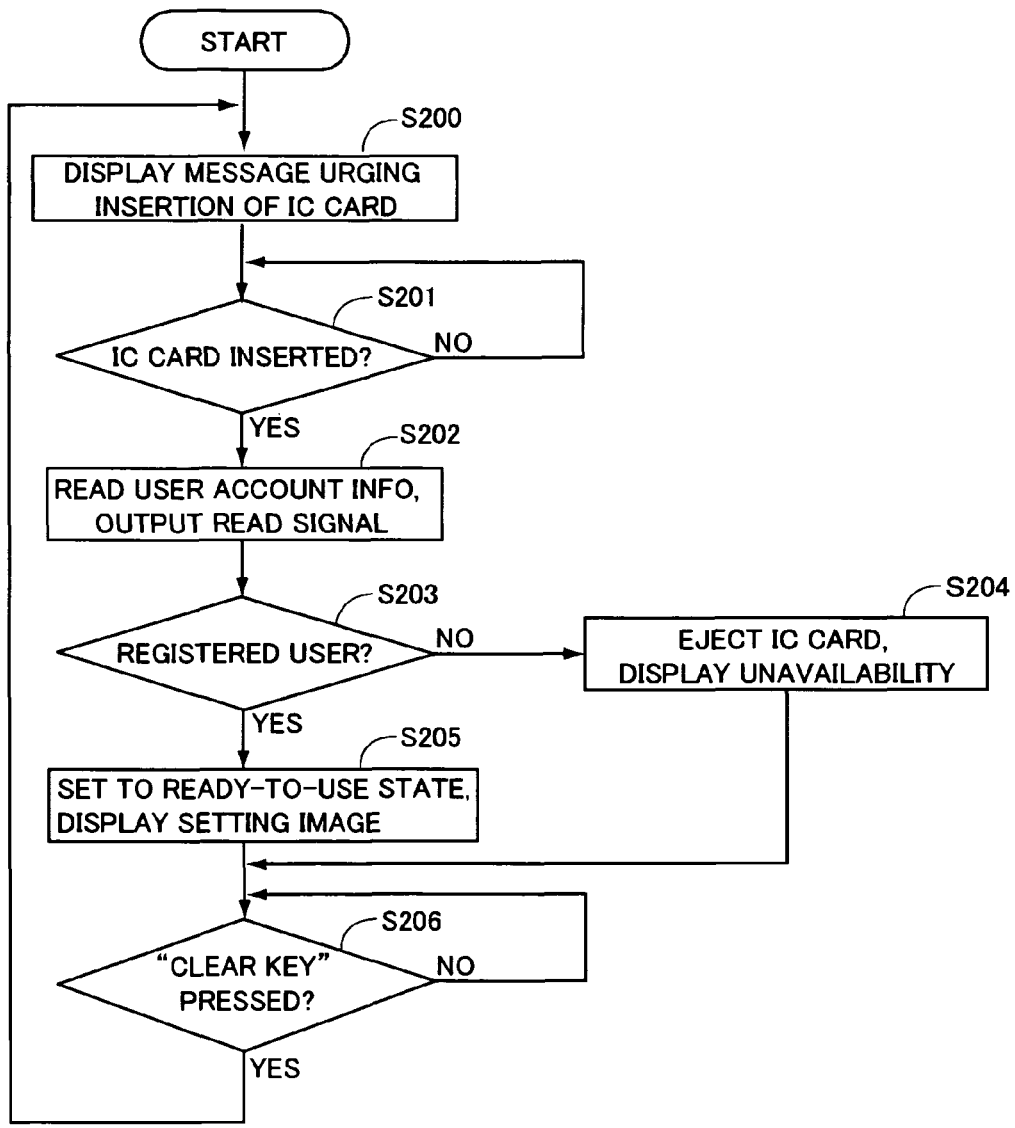

Referring to FIG. 5, the authentication program includes: a step 200 of displaying a message asking insertion of IC card 12 to a card insertion slot (not shown) of IC card reader 14, such as "Insert Card", on the display unit of operating unit 54; and a step 201 of monitoring IC card reader 14 and waiting until IC card 12 is inserted to the card insertion slot (not shown) of IC card reader 14.

The program further includes: a step 202, executed if it is determined at step 201 that IC card 12 has been inserted (YES), of causing IC card reader 14 to read the user account information included in IC card 12 in accordance with the preset IC card standard, and outputting the read signal including the read information; and a step 203 of reading the user account information of the registered users stored in HDD 52 and determining whether or not the user is a registered user, depending on whether the read user account information of the registered users includes a piece of information that matches with the read signal output from IC card reader 14, and branching control flow depending on the result of determination.

The program further includes: a step 204, executed if it is determined at step 203 that the user is not a registered user (NO), that is, if the user account information of registered users read from HDD 52 does not include any piece that matches the user account information included in the read signal output from IC card reader 14, of ejecting the IC card 12 from card insertion slot (not shown) of IC card reader 14, and displaying an error message such as "Card not supported" indicating that the user is not a registered user and the image forming apparatus 22 cannot be used, on the display unit of operating unit 54. By such a display, the user who is about to use the image forming apparatus 22 can easily recognize that he/she is not a registered user and that the image forming apparatus 22 is not available. Therefore, convenience for the user using image forming apparatus 22 can further be improved.

The program further includes a step 205, executed if it is determined at step 203 that the user is a registered user (YES), that is, if the user account information of registered users read from HDD 52 includes a piece that matches the user account information included in the read signal output from IC card reader 14, of setting image forming apparatus 22 to a state ready to use, and displaying a setting image allowing the user to input an instruction or instructions related to various processes to be performed by image forming apparatus 22, on the display unit of operating unit 54.

The program further includes a step 206 of monitoring operating unit 54 and waiting until a clear key as one of the input keys on operating unit 54 is pressed. If it is determined at step 206 that the clear key of operating unit 54 has been pressed (YES), image forming apparatus 22 is set to an unusable state, and the control returns to step 200.

[Information Processing Device 24]

As described above, the computer program stored in ROM 124 of information processing device 24 is programmed for controlling and operating information processing device 24 as a part of authentication system 10. The program is executed by an extracting function, a determining function and the like realized by cooperation of hardware and computer program, by a computer including CPU 122 substantially constituting control unit 100 controlling the operation of information processing device 24 in accordance with the computer program. The extracting function refers to a function of extracting, from the plurality of image forming apparatuses 22 connected to network 20, one to which IC card reader 14 is connected. The determining function refers to a function of performing various determining processes including a process for determining whether or not a predetermined prescribed time period has passed.

Figure 6:
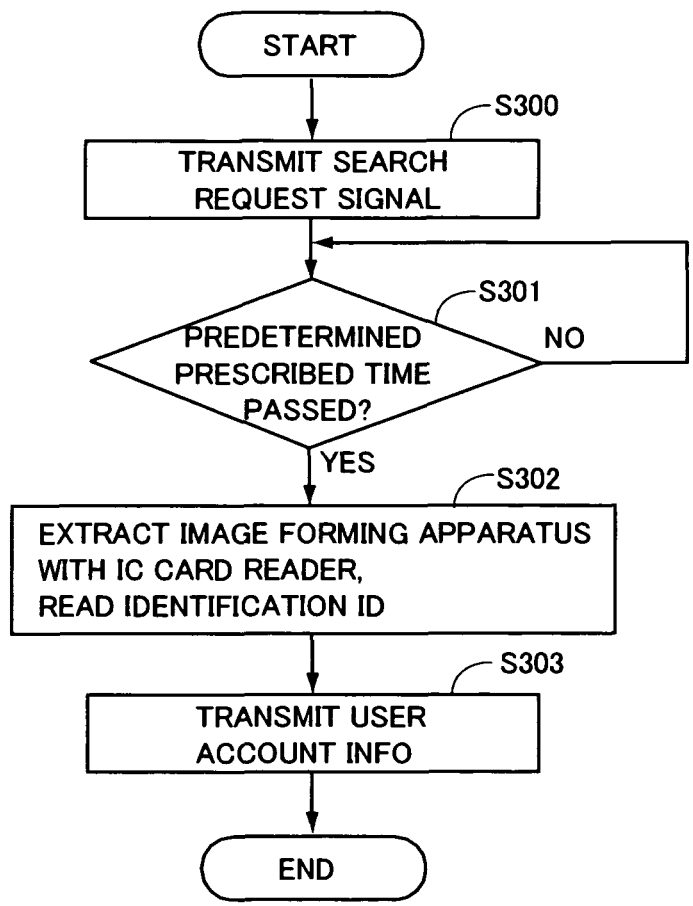
FIG. 6 shows, in the form of a flowchart, a program structure for realizing the authentication system in the information processing device.

Referring to FIG. 6, the program for realizing authentication system 10 in information processing device 24 is activated when a user or the like performs an input operation in accordance with an instruction to start the present program, through operating unit 114 of information processing device 24.

The program includes: a step 300 of transmitting the search request signal to the plurality of image forming apparatuses 22 connected to network 20 through LAN I/F 118 and network 20; and a step 301 of waiting until a predetermined prescribed time period passes from the transmission of search request signal.

The program further includes a step 302, executed if it is determined at step 301 that the predetermined prescribed time period has passed (YES), of extracting an image forming apparatus 22 having IC card reader 14 connected thereto from among the plurality of image forming apparatuses 22 connected to network 20, based on the reply signals received from image forming apparatuses 22 through LAN I/F 118 and network 20 within the predetermined prescribed time period, and reading the corresponding identification ID from the reply signal. At step 302, extracting unit 120 extracts a signal that includes data "1" indicating connection of IC card reader 14 from the received reply signals, and reads the identification ID of image forming apparatus 22 included in the extracted reply signal.

The program further includes a step 303 of reading the user account information of registered users from HDD 112, and transmitting the read user account information of registered users to the image forming apparatus 22 having the identification ID read at step 302, through LAN I/F 118 and network 20.

<Operation>

Image forming apparatuses 22A to 22D and information processing device 24 in accordance with the present embodiment operate in the following manner.

The power of information processing device 24 is always on, and when an authorized user performs a prescribed authentication and the registration program is activated, registered users of image forming apparatuses 22A and 22C have IC cards 12 recording user account information as the object of registration read by IC card reader 15 in accordance with Type-A as the preset IC card standard, so that the read user account information is stored in HDD 112.

When a user who is about to use image forming apparatus 22A or 22C turns on the power of image forming apparatus 22A or 22C, CPU 70 of control unit 50 of image forming apparatus 22A or 22C sets image forming apparatus 22A or 22C to the unusable state, and starts monitoring of LAN I/F 66 and IC card reader 14. When a user who is about to use image forming apparatus 22B or 22D turns on the power of image forming apparatus 22B or 22D, CPU 70 of control unit 50 of image forming apparatus 22B or 22D sets image forming apparatus 22B or 22D to the usable state, displays a setting image allowing the user or the like to input an instruction related to various processes performed by image forming apparatus 22B or 22D on the display unit of operating unit 54, and starts monitoring of LAN I/F 66.

When a user of information processing device 24 performs an input operation in accordance with an instruction to start the program for realizing the above-described authentication program 10 through operating unit 114 of information processing device 24, CPU 122 of control unit 100 of information processing device 24 transmits the search request signals to the plurality of image forming apparatuses 22A to 22D connected to network 20, through LAN I/F 118 and network 20.

If it is determined by CPU 70 of control unit 50 of each of image forming apparatuses 22A to 22D that LAN I/F 66 has received the search request signal transmitted from information processing device 24, search request replying unit 16 of each of image forming apparatuses 22A to 22C forms a reply signal including search reply data indicating whether or not IC card reader 14 is connected to each of image forming apparatuses 22A to 22C, and the identification ID of each of image forming apparatuses 22A to 22C. In the present embodiment, IC card readers 14A and 14C are connected to image forming apparatuses 22A and 22C and, therefore, the reply signal formed by search request replying unit 16 of each of image forming apparatuses 22A and 22C includes data "1" as the binary data indicating that IC card reader 14 is connected, and the identification ID of itself. Since IC card reader 14 is not connected to image forming apparatus 22B, the reply signal formed by search request replying unit 16 of image forming apparatus 22B includes data "0" as the binary data indicating that IC card reader 14 is not connected and the identification ID of itself.

CPU 70 of control unit 50 of each of image forming apparatuses 22A to 22C transmits the reply signal formed by search request replying unit 16 to information processing device 24 through LAN I/F 66 and network 20. Since image forming apparatus 22D does not include search request replying unit 16, it does not form or transmit the reply signal.

If it is determined by CPU 122 of control unit 100 of information processing device 24 that the predetermined prescribed time period has passed from the transmission of search request signal, extracting unit 120 of information processing device 24 extracts an image forming apparatus 22 having IC card reader 14 connected thereto from the plurality of image forming apparatuses 22A to 22D connected to network 20, based on the reply signals received from image forming apparatuses 22A to 22C through LAN I/F 118 and network 20 within the predetermined prescribed time period, and reads the corresponding identification ID from the reply signal. Specifically, extracting unit 120 extracts a signal that includes data "1" indicating that IC card reader 14 is connected, from the received reply signals, and reads identification ID of image forming apparatus 22 that is included in the extracted reply signal. In the present embodiment, reply signals including data "1" transmitted from image forming apparatuses 22A and 22C are extracted by extracting unit 120, and IP addresses as identification IDs of image forming apparatuses 22A and 22C are read. The reply signal including data "0" transmitted from image forming apparatus 22B is not extracted, and the corresponding identification ID is not read, either. Further, the identification ID corresponding to image forming apparatus 22D that did not transmit any reply signal is not read, either.

CPU 122 of control unit 100 of information processing device 24 reads the user account information of registered users from HDD 112, and transmits the read user account information of registered users to image forming apparatuses 22A and 22C having the identification IDs read by extracting unit 120, through LAN I/F 118 and network 20.

CPU 70 of control unit 50 of image forming apparatus 22B determines that the reply signal formed by search request replying unit 16 of itself does not include data "1" that indicates connection of IC card reader 14, and hence, it maintains the state of image forming apparatus 22B as at the time of power-on.

Determining that the reply signal formed by search request replying unit 16 includes data "1" indicating that IC card reader 14 is connected and that LAN I/F 66 has received the user account information of registered users, CPU 70 of control unit 50 of each of image forming apparatus 22A and 22C causes HDD 52 to store the received user account information of registered users.

CPU 70 of control unit 50 of each of image forming apparatuses 22A and 22C displays a message such as "Insert card" on the display unit of operating unit 54, asking insertion of IC card 12 to the card insertion slot (not shown) of IC card reader 14.

When the user inserts IC card 12 to the card insertion slot (not shown) of IC card reader 14 and CPU 70 of control unit 50 of image forming apparatuses 22A and 22C determines that IC card 12 has been inserted to the card insertion slot (not shown) of IC card reader 14, IC card reader 14 reads the user account information included in IC card 12 in accordance with Type-A as the preset IC card standard, and outputs the read signal including the read information, to control unit 50 of image forming apparatuses 22A and 22C.

CPU 70 of control unit 50 of each of image forming apparatuses 22A and 22C reads the user account information of registered users stored in HDD 52, and depending on whether or not the read user account information of registered users include any piece that matches the user account information included in the read signal output from IC card reader 14, determines whether or not the user is a registered user.

Determining that the user account information of registered users read from HDD 52 does not include any piece that matches the user account information included in the read signal output from IC card reader 14, and that the user is not a registered user, CPU 70 of control unit 50 of each of image forming apparatuses 22A and 22C ejects IC card 12 from the card insertion slot (not shown) of IC card reader 14, and displays a message such as "Card not supported" on the display unit of operating unit 54, indicating that the user is not a registered user and that image forming apparatus 22A or 22C is unavailable. At this time, image forming apparatus 22A or 22C is kept in a state not ready to use, and the user cannot use the image forming apparatus 22A or 22C.

Determining that the user account information of registered users read from HDD 52 includes a piece that matches the user account information included in the read signal output from IC card reader 14, and that the user is a registered user, CPU 70 of control unit 50 of each of image forming apparatuses 22A and 22C sets image forming apparatuses 22A and 22C to a state ready to use, and displays a setting image allowing the user or the like to input an instruction for various processes performed by image forming apparatuses 22A and 22C, on the display unit of operating unit 54.

When a user of each of image forming apparatus 22A to 22D or a registered user of image forming apparatus 22A or 22C confirms the displayed setting image and performs an input operation for executing a desired job through operating unit 54, CPU 70 of control unit 50 of each of image forming apparatuses 22A to 22D executes a process in accordance with the input operation by the user, based on the control signal input through operating unit 54.

When all desired processes end, the user of image forming apparatus 22B or 22D presses the clear key on operating unit 54 of image forming apparatus 22B or 22D. Determining that the clear key has been pressed, CPU 70 of control unit 50 of image forming apparatus 22B or 22D displays a setting image allowing the user to input an instruction related to various processes performed by image forming apparatus 22B or 22D, on the display unit of operating unit 54.

When all desired processes end, the registered user of image forming apparatus 22A or 22C ejects IC card 12 from the card insertion slot (not shown) of IC card reader 14, and presses the clear key on operating unit 54 of image forming apparatus 22A or 22C. Determining that the clear key has been pressed, CPU 70 of control unit 50 of image forming apparatus 22A or 22C sets image forming apparatus 22A or 22C to the unusable state, and displays a message such as "Please insert card" on the display unit of operating unit 54, asking insertion of IC card 12 to the card insertion slot (not shown) of IC card reader 14.

[First Modification]

The first modification of authentication system 10 has a configuration similar to authentication system 10 in accordance with the first embodiment, except that the preset IC card standard of IC card reader 14C connected to image forming apparatus 22C is different, the process performed at search request replying unit 16 of image forming apparatuses 22A to 22C is different and that the process performed by extracting unit 120 of information processing device 24 is different.

In the present modification, IC card standard of Type-A is set in advance for IC card readers 14A and 15, while IC card standard of Type-B is set in advance for IC card reader 14C. A registered user has an IC card 12 that supports Type-A.

<Hardware Configuration>

[Image Forming Apparatuses 22A to 22C]

Search request replying unit 16 of image forming apparatuses 22A to 22C forms a reply signal including a search reply data indicating whether or not IC card reader 14 is connected to image forming apparatuses 22A to 22C, standard information indicating IC card standard preset for IC card reader 14 to be connected, and an identification ID of image forming apparatus 22. Specifically, receiving the search request signal transmitted from information processing device 24, search request replying unit 16 reads the identification ID of itself from HDD 52, and determines whether or not IC card reader 14 is connected to USB I/F 62. If it is determined that IC card reader 14 is connected, it forms a reply signal including data "1" as the binary data indicating connection of IC card reader 14, standard information indicating the IC card standard set in advance for the connected IC card reader 14, and the read identification ID. If it is determined that IC card reader 14 is not connected, it forms a reply signal including data "0" as the binary data indicating that IC card reader 14 is not connected, and the read identification ID.

[Information Processing Device 24]

Extracting unit 120 of information processing device 24 extracts an image forming apparatus 22 to which IC card reader 14 having the same IC card standard as the IC card standard preset for IC card reader 15 connected to information processing device 24 set in advance is connected, from among the plurality of image forming apparatuses 22 connected to network 20, based on the reply signal received from image forming apparatus 22, and reads the corresponding identification ID from the reply signal. Specifically, extracting unit 120 extracts signals including data "1" indicating that IC card reader 14 is connected, from received reply signals, and further extracts, from the extracted reply signals, a signal including the standard information indicating the same IC card standard as the IC card standard preset for IC card reader 15, and reads the identification ID of image forming apparatus 22 included in the extracted reply signal.

<Software Configuration>

[Image Forming Apparatuses 22A to 22C]

The computer program stored in ROM 72 of image forming apparatuses 22A to 22C is programmed for controlling and operating image forming apparatuses 22A to 22C as a part of the first modification of authentication system 10. The program for realizing the first modification of authentication system 10 in image forming apparatuses 22A to 22C is the same as the program for realizing authentication system 10 in accordance with the first embodiment, except for the process of steps 101 and 104 (shown in FIG. 4) described above. In the following, processes at steps 101 and 104 will be described.

At step 101, executed if it is determined at step 100 that the search request signal has been received (YES), a reply signal is formed, which includes the search reply data indicating whether or not IC card reader 14 is connected to image forming apparatuses 22A to 22C, the standard information indicating the IC card standard set in advance for the IC card reader 14 to be connected, and the identification ID of image forming apparatuses 22A to 22C themselves.

At step 104, executed if it is determined at step 103 that data "1" is included (YES), LAN I/F 66 is monitored, whether or not the user account information of registered users has been received from information processing device 24 within a predetermined prescribed time period is determined, and the control flow is branched depending on the result of determination. If it is determined at step 104 that the user account information of registered users has not been received within the predetermined prescribed time period (NO), control returns to step 100.

The process at step 105 is executed if it is determined at step 104 that the user account information of registered users has been received within the predetermined prescribed time period (YES).

[Information Processing Device 24]

The computer program stored in ROM 124 of information processing device 24 is programmed for controlling and operating information processing device 24 as a part of the first modification of authentication system 10. The program for realizing the first modification of authentication system 10 in information processing device 24 is the same as the program for realizing authentication system 10 in accordance with the first embodiment described above, except for the process at step 302 (see FIG. 5). In the following, the process at step 302 will be described.

Step 302 is executed if it is determined at step 301 that the predetermined prescribed time period has passed (YES). At this step, based on the reply signals received from image forming apparatuses 22 through LAN I/F 118 and network 20 within the predetermined prescribed time period, an image forming apparatus 22, to which IC card reader 14 having the same IC card standard set in advance as the IC card standard preset for IC card reader 15 connected to information processing device 24 is connected, is extracted from the plurality of image forming apparatuses 22 connected to network 20, and the corresponding identification ID is read from the reply signal. At step 302, extracting unit 120 extracts signals including data "1" indicating that IC card reader 14 is connected, from the received reply signals, further extracts, from the extracted reply signals, a signal including the standard information indicating the same IC card standard as the IC card standard set in advance for IC card reader 15, and reads the identification ID of image forming apparatus 22 included in the extracted reply signal.

<Operation>

Image forming apparatuses 22A to 22D and information processing device 24 in accordance with the present modification operate in the following manner. The operations in accordance with the present modification are the same as those in the first embodiment described above except for the operation of forming reply signals at search request replying units 16 of image forming apparatuses 22A to 22C, the operation of extracting image forming apparatus 22 and the operation of reading identification ID by extracting unit 120 of information processing device 24. In the following, different operations will be described.

If it is determined by CPU 70 of control unit 50 in image forming apparatuses 22A to 22D that the search request signal from information processing device 24 has been received by LAN I/F 66, search request replying units 16 of image forming apparatuses 22A to 22C form reply signals including search reply data indicating whether or not IC card reader 14 is connected to image forming apparatuses 22A to 22C, standard information indicating the IC card standard preset for the IC card reader 14 to be connected, and identification IDs of image forming apparatuses 22A to 22C, respectively. In the present modification, IC card reader 14A is connected to image forming apparatus 22A and, therefore, the reply signal formed by search request replying unit 16 of image forming apparatus 22A includes data "1" as binary data indicating that IC card reader 14A is connected, standard information representing Type-A as the IC card standard preset for IC card reader 14A, and identification ID of itself. Since IC card reader 14 is not connected to image forming apparatus 22B, the reply signal formed by search request replying unit 16 of image forming apparatus 22B includes data "0" as binary data indicating that IC card reader 14 is not connected, and identification ID of itself. IC card reader 14C is connected to image forming apparatus 22C and, therefore, the reply signal formed by search request replying unit 16 of image forming apparatus 22C includes data "1" as binary data indicating that IC card reader 14C is connected, standard information representing Type-B as the IC card standard preset for IC card reader 14C, and identification ID of itself.

If it is determined by CPU 122 of control unit 100 of information processing device 24 that the predetermined prescribed time period has passed from the transmission of search request signal, extracting unit 120 extracts, based on the reply signals received from image forming apparatuses 22A to 22C through LAN I/F 118 and network 20 within the predetermined prescribed time period, an image forming apparatus 22 to which IC card reader 14 having the same IC card standard preset therefor as that preset for the IC card reader 15 connected to information processing device 24, among the plurality of image forming apparatuses 22A to 22D connected to network 20, and reads the corresponding identification ID. Specifically, extracting unit 120 extracts, from the received reply signals, signals including data "1" indicating that IC card reader 14 is connected, further extracts, from the extracted reply signals, a signal including standard information representing the same IC card standard as that preset for IC card reader 15, and reads the identification ID of image forming apparatus 22 included in the extracted reply signal. In the present modification, the reply signal including data "1" and the standard information representing Type-A transmitted from image forming apparatus 22A is extracted, and the IP address of image forming apparatus 22A as its identification ID is read by extracting unit 120. The reply signal including data "0" transmitted from image forming apparatus 22B is not extracted, and the corresponding identification ID is not read, either. The reply signal including data "1" and the standard information representing Type-B transmitted from image forming apparatus 22C is not extracted and the corresponding identification ID is not read, either. The identification ID corresponding to image forming apparatus 22D that did not transmit the reply signal is not read, either.

CPU 122 of control unit 100 of information processing device 24 reads the user account information of registered users from HDD 112, and transmits the read user account information of registered users to image forming apparatus 22A having the identification ID read by extracting unit 120, through LAN I/F 118 and network 20.

Determining that the reply signal formed by search request replying unit 16 includes data "1" indicating connection of IC card reader 14 and that LAN I/F 66 has received the user account information of registered users transmitted from information processing device 24 within the predetermined prescribed time period, CPU 70 of control unit 50 of image forming apparatus 22A stores the received user account information of registered users in HDD 52.

CPU 70 of control unit 50 of image forming apparatus 22C determines that the reply signal formed by search request replying unit 16 includes data "1" indicating connection of IC card reader 14 and that LAN I/F 66 has not received the user account information of registered users transmitted from information processing device 24 within the predetermined prescribed time period. At this time, the user account information of registered users is not stored in HDD 52.

According to the first modification of authentication system 10, for IC card reader 14A, Type-A as the prescribed reading method for reading the user account information from IC card 12 is set in advance. Control unit 100 and LAN I/F 118 of information processing device 24 inquire whether IC card reader 14 reading the user account information in accordance with Type-A from IC card 12 is connected or not, by transmitting the search request signal, to each of the plurality of image forming apparatuses 22. In response to reception of the search request signal by LAN I/F 66, search request replying unit 16 and LAN I/F 66 of image forming apparatus 22 determines whether or not IC card reader 14 reading the user account information in accordance with Type-A from IC card 12 is connected to image forming apparatus 22, and in accordance with the result of determination, form the reply signal and transmit the signal to information processing device 24.

In this manner, based on the reply signals in response to the search request signal as an inquiry as to whether IC card reader 14 reading user account information in accordance with Type-A from IC card 12 is connected or not, transmitted from the plurality of image forming apparatuses 22, it is possible for information processing device 24 capable of data communication with a plurality of image forming apparatuses 22 to extract the image forming apparatus 22 having connected thereto the IC card reader 14 for which Type-A has been set in advance from the plurality of image forming apparatuses 22, and to transmit the user account information of registered users to the extracted image forming apparatus 22. Therefore, as compared with an approach in which user account information of registered users is transmitted to every image forming apparatus 22 performing data communication through network 20, information processing device 24 needs to transmit the information to a smaller number of destinations and, therefore, load required for the transmission process can further be reduced. Further, it is possible to have the user account information of registered users received at one time by all the image forming apparatuses 22 having connected thereto IC card readers 14 for which Type-A has been set in advance. Therefore, as regards the image forming apparatuses 22 having connected thereto IC card readers 14 for which Type-A has been set in advance, it is unnecessary for the user to store the user account information of registered users in each and every image forming apparatus 22 and, therefore, the trouble required for the process of storing user account information of registered users can be saved.

Further, image forming apparatus 22C, for which Type-B is set in advance, cannot read the user account information included in IC card 12 that supports Type-A held by the registered user and, therefore, it cannot perform the authentication process. Since the user account information of registered users to be used for the authentication process is not transmitted to image forming apparatus 22C, unnecessary transmission process can more efficiently be omitted.

[Second Modification]

The second modification of authentication system 10 has the same configuration as authentication system 10 in accordance with the first embodiment described above, except that image forming apparatus 22 transmits a distribution acknowledgment signal, that distribution log information is stored in HDD 112 of information processing device 24, and that the process for transmitting user account information of registered users by information processing device 24 is different.

<Hardware Configuration>
[Information Processing Device 24]

In response to a distribution acknowledgment signal, which is transmitted by image forming apparatus 22 to information processing device 24 upon reception of the user account information of registered users, HDD 112 stores distribution log information. Here, the distribution acknowledgment signal is to notify that image forming apparatus 22 has successfully received the user account information of registered users, and it includes an identification ID of image forming apparatus 22 itself, and distribution date and time information indicating date and time of reception of the user account information of registered users. Specifically, based on the distribution acknowledgment signal transmitted from image forming apparatus 22, HDD 112 stores the identification ID of image forming apparatus 22 itself included in the distribution acknowledgement signal, representing the distribution destination information, the distribution date and time information included in the distribution acknowledgment signal, and the distribution status information related to each other, as the distribution log information. Here, the distribution status information refers to the information indicating whether or not the image forming apparatus 22 has successfully received the user account information of registered users. In the present modification, 1 bit of data is used as the distribution status information. Specifically, when information processing device 24 receives the distribution acknowledgment signal, HDD 112 stores, as the distribution status information, data "1" as the binary data indicating successful reception of user account information of registered users by image forming apparatus 22. On the contrary, if the distribution acknowledgment signal is not received, it stores as the distribution status information, data "0" as the binary data indicating that image forming apparatus 22 has failed to receive the user account information of registered users. When information processing device 24 first transmits the user account information of the registered users to image forming apparatus 22, that is, at the time of first transmission of user account information of registered users, the identification ID of image forming apparatus 22 read by extracting unit 120 is stored as the distribution destination information, the date and time when information processing device 24 first transmitted the user account information of registered users are stored as the distribution date and time information, and data "0" as the binary data indicating that image forming apparatus 22 has failed to receive the user account information of registered users is stored as the distribution status information, in the distribution log information. The distribution log information is rewritten when information processing device 24 receives a distribution acknowledgment signal. Table 1 shows an example of distribution log information.

TABLE 1

| Distribution destination information | Distribution date and time information | Distribution status information |
| --- | --- | --- |
| 102.0.0.1 | 2008.05.13.12:15 | 1 |
| 102.0.0.3 | 2008.05.13.11:00 | 0 |

Referring to Table 1, by way of example, in the distribution log information, IP address "102.0.0.1" as the identification ID of image forming apparatus 22A is stored as the distribution destination information, "2008.05.13.12:15" representing fifteen minutes past twelve of May 13, 2008 is stored as the distribution date and time information, and data "1" is stored as the distribution status information. Here, it means that image forming apparatus 22A successfully received the user account information of registered users at fifteen minutes past twelve of May 13, 2008. Further, in the distribution log information, IP address "102.0.0.3" as the identification ID of image forming apparatus 22C is stored as the distribution destination information, "2008.05.13.11:00" representing eleven o'clock of May 13, 2008 is stored as the distribution date and time information, and data "0" is stored as the distribution status information. Here, it means that image forming apparatus 22C has not yet successfully received the user account information of registered users, since information processing device 24 first transmitted the user account information of registered users at eleven o'clock of May 13, 2008.

<Software Configuration>
[Image Forming Apparatuses 22A to 22C]

The computer program stored in ROM 72 of each of image forming apparatuses 22A to 22C is programmed for controlling and operating image forming apparatuses 22A to 22C as a part of the second modification of authentication system 10. The program for realizing the second modification of authentication system 10 in image forming apparatuses 22A to 22C is the same as the program for realizing authentication system 10 in the first embodiment described above, except for the process at step 105 (see FIG. 4) above. In the following, the process at step 105 will be described.

Step 105 is executed if it is determined at step 104 that the user account information of registered users has been received (YES). At this step, the received user account information of registered users is stored in HDD 112, and the distribution acknowledgment signal notifying successful reception of user account information of registered users is transmitted to information processing device 24 through LAN I/F 66 and network 20.

[Information Processing Device 24]

Figure 7:
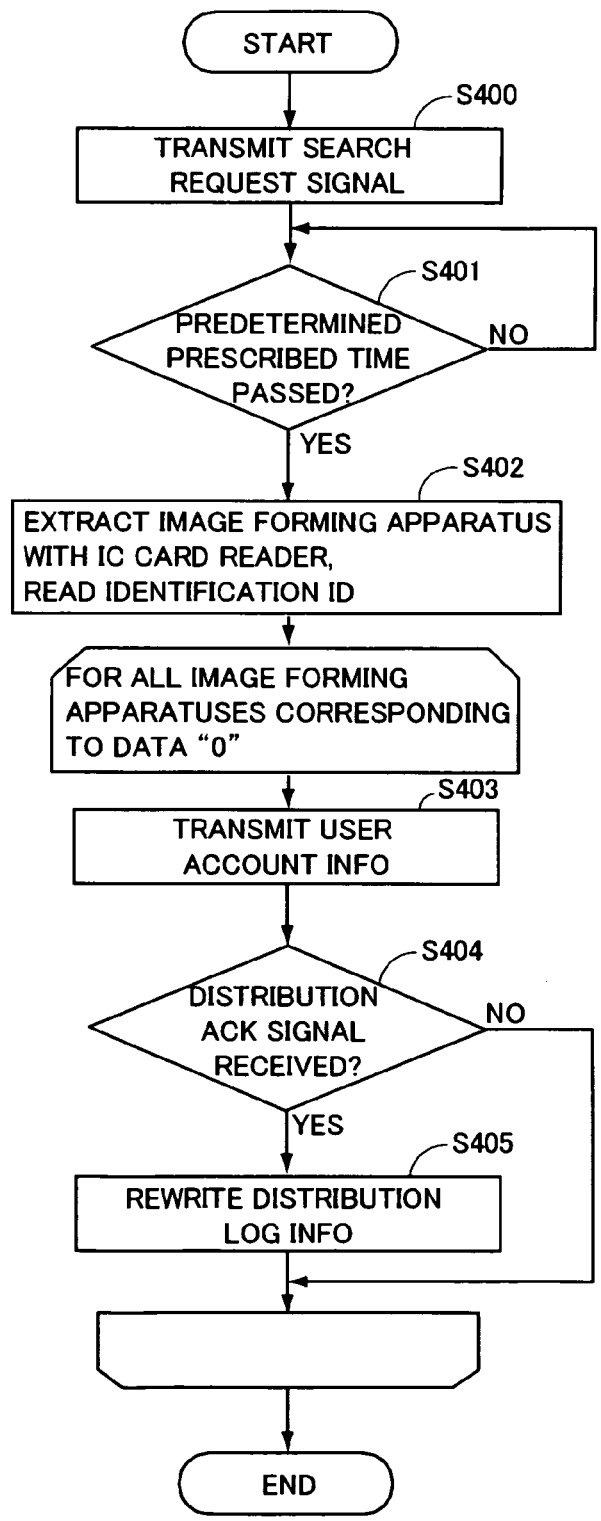
FIG. 7 shows, in the form of a flowchart, a program structure for realizing a second modification of the authentication system in the information processing device.

The computer program stored in ROM 124 of information processing device 24 is programmed for controlling and operating information processing device 24 as a part of the second modification of authentication system 10. Referring to FIG. 7, in the program for realizing the second modification of authentication system 10 in information processing device 24, the processes of steps 400 to 402 are the same as the processes of steps 300 to 302 (see FIG. 6) of the program for realizing authentication system 10 in accordance with the first embodiment described above.

The program further includes a process of repeating the following steps, for every image forming apparatus 22 that has its identification ID stored as the distribution destination information corresponding to data "0" stored as the distribution status information in the distribution log information. Specifically, the process includes a step 403 of reading the user account information of registered users from HDD 112, and transmitting the read user account information of registered users to that one of the image forming apparatuses 22 having the identification IDs read at step 402 which has the identification ID stored in the distribution destination information corresponding to the data "0" stored in the distribution status information in the distribution log information, through LAN I/F 118 and network 20. At step 403, at the time of first transmission of user account information of registered users, the identification ID of image forming apparatus 22 read by extracting unit 120 is stored as the distribution destination information, the date and time when information processing device 24 first transmitted the user account information of registered users are stored as the distribution date and time information, and data "0" as the binary data indicating that image forming apparatus 22 has not yet successfully received the user account information of registered users is stored as the distribution status information, in the distribution log information.

The process further includes a step 404 of monitoring LAN I/F 118, determining whether or not LAN I/F 118 has received the distribution acknowledgment signal transmitted from image forming apparatus 22 within a predetermined prescribed time period from the transmission of user account information of registered users, and branching control flow depending on the result of determination. If it is determined at step 404 that the distribution acknowledgment signal was not received within the predetermined prescribed time period (NO), the present process is repeated.

The process further includes a step 405, executed if it is determined at step 404 that the distribution acknowledgment signal was received within the predetermined prescribed time period (YES), of rewriting the distribution log information stored in HDD 112. Specifically, at step 405, based on the received distribution acknowledgment signal, the identification ID of image forming apparatus 22 included in the distribution acknowledgment signal indicating the distribution destination information, the distribution date and time information included in the distribution acknowledgment signal, and the data "1" indicating successful reception of user account information of registered users by image forming apparatus 22, representing the distribution status information, are related to each other, and overwritten on the corresponding distribution log information and stored in HDD 112.

<Operation>

Image forming apparatuses 22A to 22D and information processing device 24 in accordance with the present modification operate in the following manner. The operations of the present modification are the same as those of the first embodiment described above, except for the operation of image forming apparatus 22 transmitting the distribution acknowledgment signal, the operation of information processing device 24 storing the distribution log information in HDD 112, and the operation of information processing device 24 transmitting the user account information of registered users. In the following, different operations will be described.

When the user account information of registered users is transmitted for the first time, that is, at the first transmission, in the distribution log information, identification ID of image forming apparatus 22 read by extracting unit 120 is stored as the distribution destination information, the date and time when information processing device 24 first transmitted the user account information of registered users are stored as the distribution date and time information, and data "0" as the binary data indicating that image forming apparatus 22 has not yet successfully received the user account information of registered users is stored as the distribution status information. Along with the operation of storing the distribution log information, the first transmitting operation of user account information of registered users is performed in the following manner. Specifically, CPU 122 of control unit 100 of information processing device 24 reads the user account information of registered users from HDD 112, and transmits the read user account information of registered users to image forming apparatuses 22A and 22C that have identification IDs read by extracting unit 120 and stored as the distribution destination information corresponding to the distribution log information storing data "0" as the distribution status information, through LAN I/F 118 and network 20.

Determining that the reply signal formed by search request replying unit 16 includes data "1" indicating that IC card reader 14 is connected, and that LAN I/F 66 has received the user account information of registered users transmitted from information processing device 24, CPU 70 of control unit 50 of image forming apparatus 22A stores the received user account information of registered users in HDD 52. While the user account information of registered users is stored, the distribution acknowledgment signal notifying successful reception of user account information of registered users is transmitted to information processing device 24 through LAN I/F 66 and network 20.

On the other hand, assume that after transmitting the reply signal to information processing device 24, image forming apparatus 22C has some communication trouble because of, for example, malfunction, and data communication with information processing device 24 becomes impossible. CPU 70 of control unit 50 of image forming apparatus 22C determines that the reply signal formed by search request replying unit 16 includes data "1" indicating that IC card reader 14 is connected, and that LAN I/F 66 has not yet received the user account information of registered users from information processing device 24. Here, CPU 70 of control unit 50 of image forming apparatus 22C does not perform the operation of storing the user account information of registered users or the operation of transmitting the distribution acknowledgment signal.

Determining that the distribution acknowledgment signal transmitted from image forming apparatus 22A has been received within a predetermined prescribed time period, for example, within 15 to 30 minutes from transmission of user account information of registered users, CPU 122 of control unit 100 of information processing device 24 rewrites the distribution log information stored in HDD 112. Specifically, based on the received distribution acknowledgment signal, it rewrites the identification ID of image forming apparatus 22A itself, included in the distribution acknowledgment signal, indicating the distribution destination information, the distribution date and time information included in the distribution acknowledgment signal, and the data "1" indicating successful reception of user account information of registered users by image forming apparatus 22A indicating the distribution status information, related to each other, on the corresponding distribution log information, to be stored in HDD 112.

Within 15 to 30 minutes after transmission of user account information of registered users from information processing device 24 to image forming apparatus 22A, communication trouble of image forming apparatus 22C is solved and data communication with information processing device 24 is resumed.

CPU 122 of control unit 100 of information processing device 24 reads the user account information of registered users from HDD 112, and transmits the read user account information of registered users to image forming apparatus 22C having the identification ID read by extracting unit 120 and stored as the distribution destination information corresponding to the data "0" stored as the distribution status information in the distribution log information, through LAN I/F 118 and network 20.

Determining that LAN I/F 66 has received the user account information of registered users transmitted from information processing device 24, CPU 70 of control unit 50 of image forming apparatus 22C stores the received user account information of registered users in HDD 52. Then, while the user account information of registered users are stored, a distribution acknowledgment signal indicating successful reception of user account information of registered users is transmitted to information processing device 24 through LAN I/F 66 and network 20.

Determining that the distribution acknowledgment signal transmitted from image forming apparatus 22C has been received within the predetermined prescribed time period, for example, within 15 to 30 minutes, from the latest transmission of user account information of registered users, CPU 122 of control unit 100 of information processing device 24 rewrites the distribution log information stored in HDD 112. Specifically, based on the received distribution acknowledgment signal, it rewrites the identification ID of image forming apparatus 22C itself, included in the distribution acknowledgment signal indicating the distribution destination information, the distribution date and time information included in the distribution acknowledgment signal, and the data "1" indicating successful reception of user account information of registered users by image forming apparatus 22C indicating the distribution status information, related to each other, on the corresponding distribution log information, to be stored in HDD 112. Consequently, in the distribution log information, data "1" is stored in every piece of distribution status information corresponding to the identification ID read by extracting unit 120.

After the received user account information of registered users is stored in HDD 52, CPU 70 of control unit 50 of each of image forming apparatuses 22A and 22C performs prescribed processes including the authentication process, in the similar manner as image forming apparatuses 22A and 22C in the first embodiment.

According to the second modification of authentication system 10, LAN I/F 66 of image forming apparatuses 22A and 22C having IC card readers 14A and 14C connected thereto transmits the distribution acknowledgment signal notifying successful reception of user account information of registered users to information processing device 24. In information processing device 24, LAN I/F 118 receives the distribution acknowledgment signal and, if it is determined by CPU 122 of control unit 100 that predetermined prescribed time period has passed from the transmission of user account information of registered users, it again transmits the user account information of registered users to that image forming apparatus 22 extracted by extracting unit 120 which has not yet transmitted the distribution acknowledgment signal.

In this manner, if it is determined by CPU 122 of control unit 100 that the predetermined prescribed time period has passed from the transmission of user account information of registered users, LAN I/F 118 of information processing device 24 re-transmits the user account information of registered users stored in HDD 112, to that image forming apparatus 22 extracted by extracting unit 120 which has not yet transmitted the distribution acknowledgment signal. Therefore, even if data communication temporarily failed between image forming apparatus 22 and information processing device 24 because of some communication trouble and the image forming apparatus 22 could not receive the user account information of registered users, the image forming apparatus 22 can later receive the user account information of registered users and, hence, more reliable authentication process becomes possible. Further, as compared with the approach in which the user account information of registered users is transmitted every time the predetermined prescribed time period passes from the transmission of user account information of registered users, the number of destinations for transmitting the information can be reduced and, therefore, the load required for the transmission process can further be reduced.

Further, HDD 112 stores the identification ID as the distribution destination information indicating image forming apparatus 22 as the destination of transmitting user account information of registered users, the distribution date and time information indicating the date and time of transmission or reception of user account information of registered users, and the distribution status information indicating whether or not the image forming apparatus 22 has successfully received the user account information of registered users, related to each other, as the distribution log information.

Since the distribution log information is stored in this manner, it becomes possible for CPU 122 of control unit 100 of information processing device 24 to determine with higher reliability whether the predetermined prescribed time period has passed from the transmission of user account information of registered users, and for LAN I/F 118 to re-transmit with higher reliability the user account information of registered users to that image forming apparatus 22 extracted by extracting unit 120 which has not yet transmitted the distribution acknowledgment signal. Therefore, even if data communication should temporarily fail between image forming apparatus 22 and information processing device 24 because of some communication trouble and the image forming apparatus 22 cannot receive the user account information of registered users, it is possible to have the image forming apparatus 22 later receive with higher reliability the user account information of registered users and, hence, more reliable authentication process becomes possible.

The second modification of authentication system 10 described above is adopted to repeatedly transmit the user account information of registered users to image forming apparatus 22 that has not yet transmitted the distribution acknowledgment signal. The present invention, however, is not limited to such an example. By way of example, if it is determined by CPU 122 of control unit 100 that a predetermined prescribed time period, for example, 24 hours, has passed from the transmission of user account information of registered users, LAN I/F 118 of information processing device 24 may repeatedly re-transmit the user account information of registered users to all image forming apparatuses 22 extracted by extracting unit 120. As the user account information of registered users is periodically and repeatedly transmitted, it is possible to have the user account information of registered users received with high reliability by image forming apparatus 22 having IC card reader 14 connected thereto, even when data communication temporarily fails between image forming apparatus 22 and information processing device 24 because of some communication trouble or the like and, therefore, more reliable authentication process becomes possible. Further, when the user account information of registered users is changed, it is possible for image forming apparatus 22 to perform the authentication process based on the latest user account information of registered users and, therefore, more reliable determination becomes possible.

Second Embodiment

Figure 8:
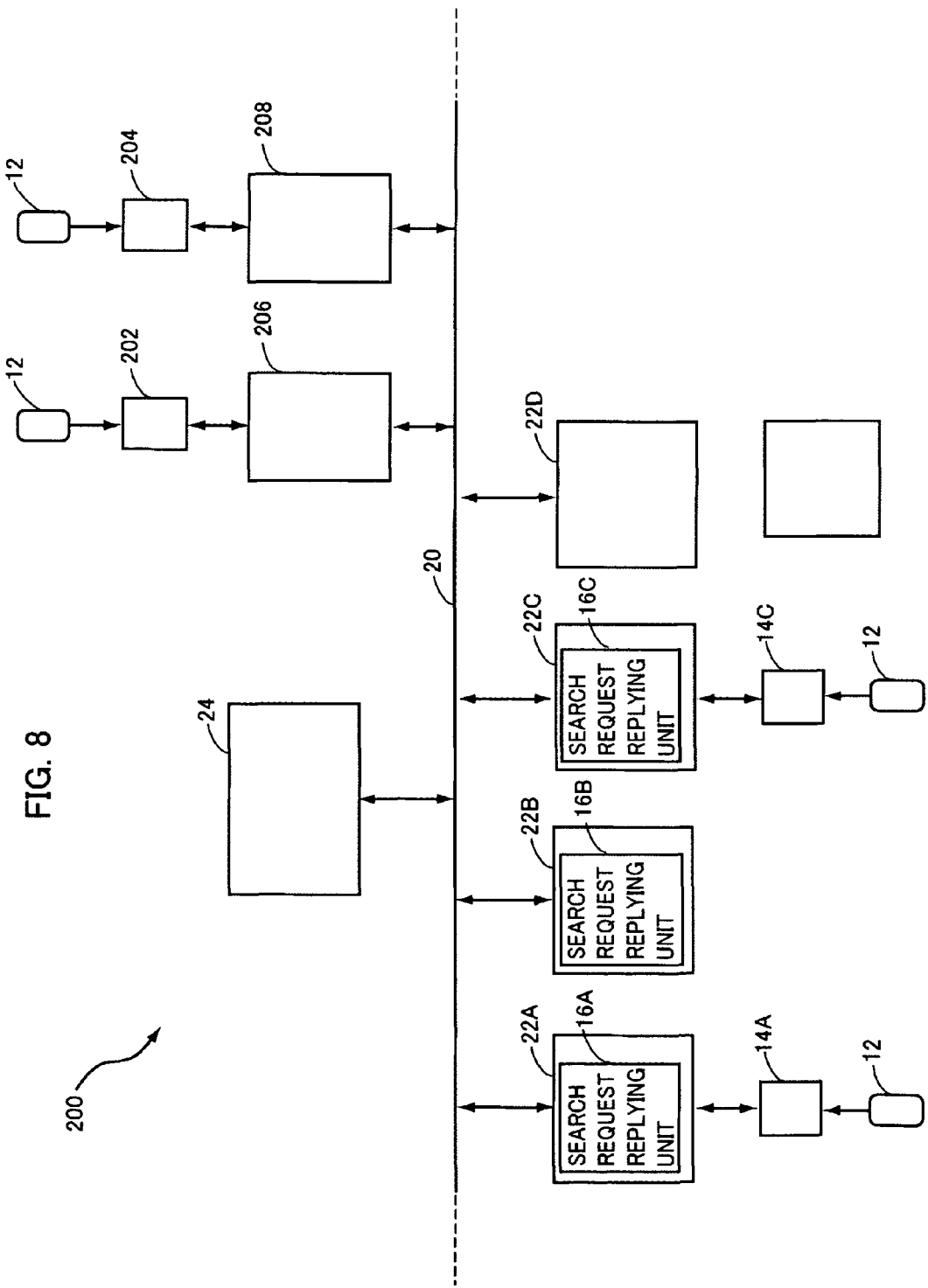
FIG. 8 is a block diagram schematically showing a configuration of the authentication system in accordance with the second embodiment.

Referring to FIG. 8, an authentication system 200 has the same configuration as authentication system 10 in accordance with the first embodiment described above, except that the system additionally includes information terminals 206 and 208 connected to IC card readers 202 and 204, and that IC card reader 15 is not connected to information processing device 24.

In authentication system 200, information terminals 206 and 208 perform data communication with image forming apparatuses 22A to 22D and information processing device 24 through network 20. IC card readers 202 and 204 have the same configuration as IC card reader 15 of the first embodiment, and read user account information from IC card 12. IC card standard of Type-A is set in advance for IC card readers 202 and 204.

In authentication system 200, information terminals 206 and 208 transmit the user account information of registered users read by IC card readers 202 and 204, to information processing device 24. Information processing device 24 transmits the user account information of registered users received from information terminals 206 and 208 to image forming apparatuses 22A and 22C having IC card readers 14A and 14C connected thereto. Image forming apparatuses 22A and 22C perform the authentication process based on the received user account information of registered users and the user account information read by IC card readers 14A and 14C, and execute a prescribed process in accordance with the result of authentication process.

<Hardware Configuration>
[Information Processing Device 24]

In information processing device 24, IC card reader 15 is not connected to USB I/F 110. In HDD 112, various data including the user account information of registered users transmitted from information terminals 206 and 208 are stored.

[Information Terminal 206 (208)]

Information terminals 206 and 208 have the same configuration. In the following, description will be given on information terminal 206 as a representative of information terminals 206 and 208, and corresponding components of information terminal 208 will be denoted by reference characters in parentheses.

Figure 9:
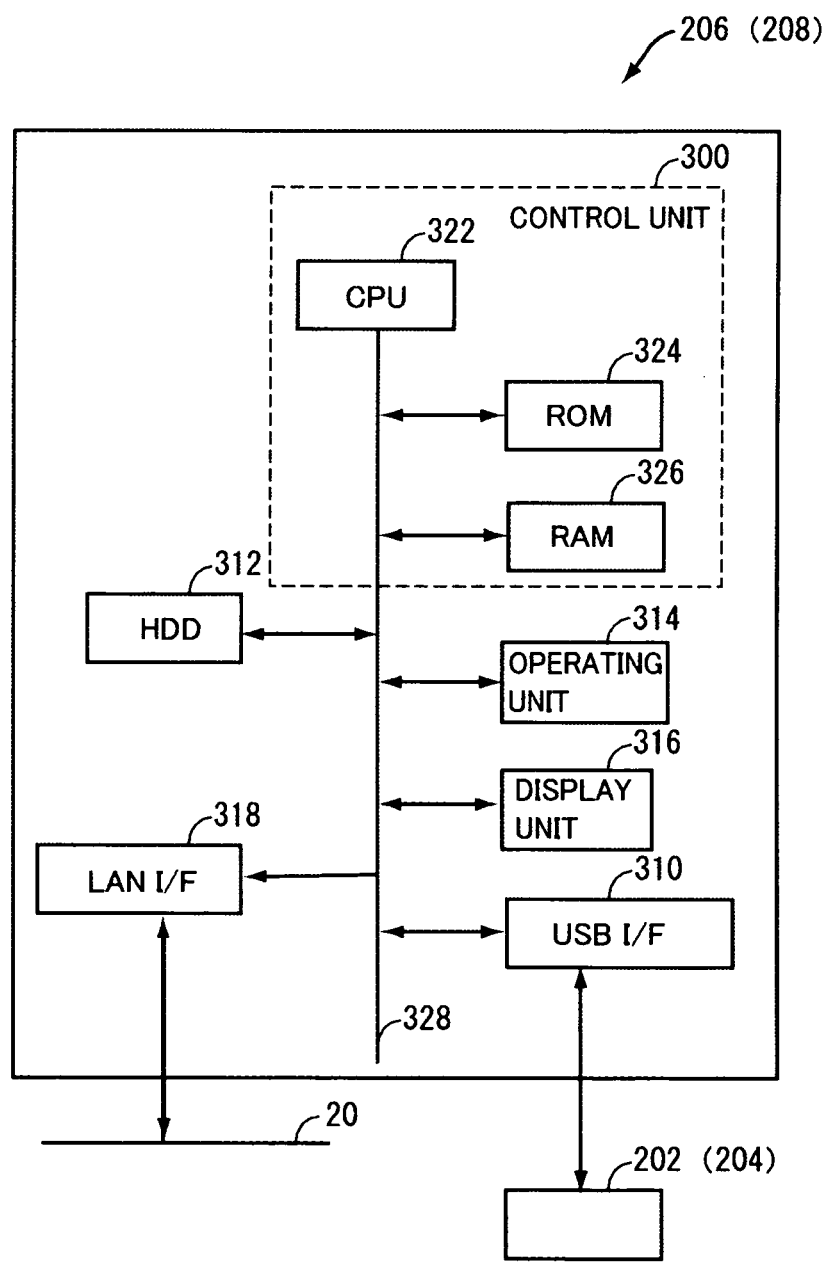
FIG. 9 is a block diagram showing a configuration of an information terminal.

Referring to FIG. 9, information terminal 206 (208) includes a control unit 300, an USB I/F 310, an HDD 312, an operating unit 314, a display unit 316, and an LAN I/F 318.

Control unit 300 is substantially a computer, including a CPU 322, an ROM 324 and an RAM 326. To CPU 322, a bus line 328 is connected, and to bus line 328, ROM 324 and RAM 326 are electrically connected. CPU 322 executes a desired process such as communication with an external device such as information processing device 24 and operations of various components of information terminal 206 (208), by executing various computer programs in accordance with an instruction from operating unit 314 or from an external device such as information processing device 24. The various computer programs mentioned above are stored in advance in ROM 324, and when a desired process is executed, read from ROM 324 and transferred to RAM 326. CPU 322 reads a program instruction from an address in RAM 326 designated by a value stored in a register, which is referred to as a program counter, not shown, in CPU 322, and interprets the instruction. Further, CPU 322 reads data necessary for operation from an address designated by the read instruction, and executes an operation corresponding to the instruction on the data. The result of execution is also stored at an address designated by the instruction, in a register, for example, in CPU 322, HDD 312 and RAM 326.

In the present embodiment, ROM 324 stores a transmission program, which is a computer program for controlling and operating information terminal 206 (208) as a part of authentication system 200. The transmission program is for executing the process of transmitting the user account information of registered users. The program is activated when a user authorized to execute the program performs a prescribed authentication using, for example, a password. The control structure of the program will be described later.

To bus line 328, HDD 312, USB I/F 310, operating unit 314, display unit 316 and LAN I/F 318 are further electrically connected.

USB I/F 310 is a Hot-Plug-supporting interface having a USB port. USB I/F 310 automatically recognizes any external device electrically connected through a USB cable while information terminal 206 (208) is in operation. In information terminal 206 (208), IC card reader 202 (204) is connected to USB I/F 310. IC card reader 202 (204) is an information reading device performing the process for reading the user account information included in IC card 12. After the prescribed authentication is done by an authorized user and the transmission program is activated, IC card reader 202 (204) reads, when IC card reader 12 having recorded thereon the user account information as the object of recording is inserted to the card insertion slot (not shown), the user account information contained in IC card 12 in accordance with Type-A as the preset IC card standard, and outputs a read signal including the read information to control unit 300. Specifically, only the user authorized to perform prescribed authentication is allowed to have the IC card 12, recording the user account information of registered user as the user account information to be recorded, read by IC card reader 202 (204) and to have the read signal including the read information output to control unit 300.

HDD 312 includes a magnetic recording medium, and provides a storage area for storing various data. Operating unit 314 is implemented by a keyboard as an input device for character inputs and various inputs in accordance with, for example, a user instruction. Display unit 316 is a display device such as a liquid crystal display for displaying, for example, results of processing by information terminal 206 (208). Operating unit 314 and display unit 316 are connected through an interface (not shown) to bus line 328.

Information terminal 206 (208) is connected to network 20 implemented by a LAN line through LAN I/F 318, and it is capable of data communication with information processing device 24 and image forming apparatus 22 connected to network 20.

A power source (not shown) is connected to each component of information terminal 206 (208). Operations of various components in information terminal 206 (208) are realized when voltage is applied from the power source.

<Software Configuration>
[Information Processing Device 24]

Figure 10:
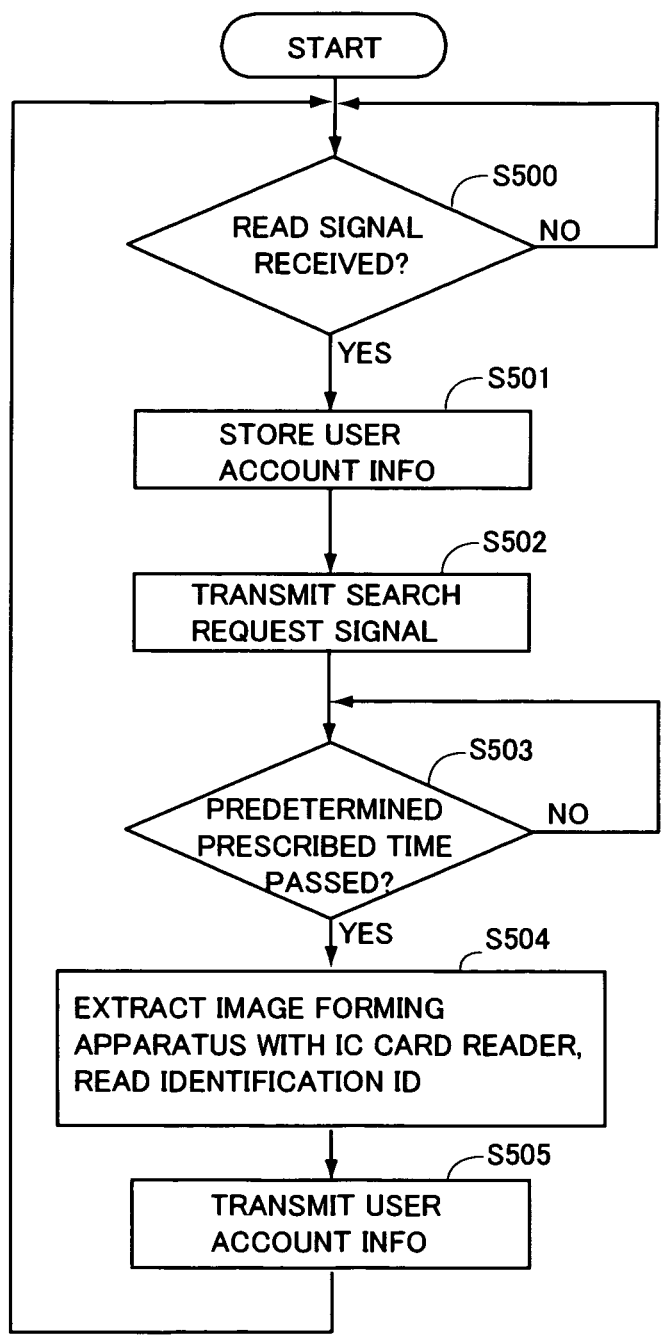
FIG. 10 shows, in the form of a flowchart, a program structure for realizing the authentication system in the information processing device.

A computer program stored in ROM 124 of information processing device 24 is programmed for controlling and operating information processing device 24 as a part of authentication system 200. Referring to FIG. 10, in the program for realizing authentication system 200 in information processing device 24, the processes of steps 502 to 505 are the same as those of steps 300 to 303 (see FIG. 6) of the program for realizing authentication system 10 in accordance with the first embodiment described above.

The program for realizing authentication system 200 in information processing device 24 is activated by an input operation by a user or the like in accordance with an instruction to start the program, through operating unit 114 of information processing device 24. The program ends when the power of information processing device 24 is turned off, for example, by the user.

The program includes a step 500 of monitoring LAN I/F 118 and waiting until LAN I/F 118 receives the read signal from information terminal 206 (208); and a step 501, executed if it is determined at step 500 that the read signal has been received (YES), of storing the user account information of registered users included in the read signal in HDD 112. At step 501, if the user account information of registered users has already been stored in HDD 112, the information included in the received read signal is stored to be newly added to the already stored user account information of registered users.

[Information Terminal 206 (208)]

As described above, the transmission program stored in ROM 324 of information terminal 206 (208) is programmed for controlling and operating information terminal 206 (208) as a part of authentication system 200. The program is executed through various determining functions and the like realized by cooperation between hardware and the computer program, by a computer including a CPU 322 substantially constituting control unit 300, controlling operations of information terminal 206 (208) in accordance with the computer program described above.

Figure 11:
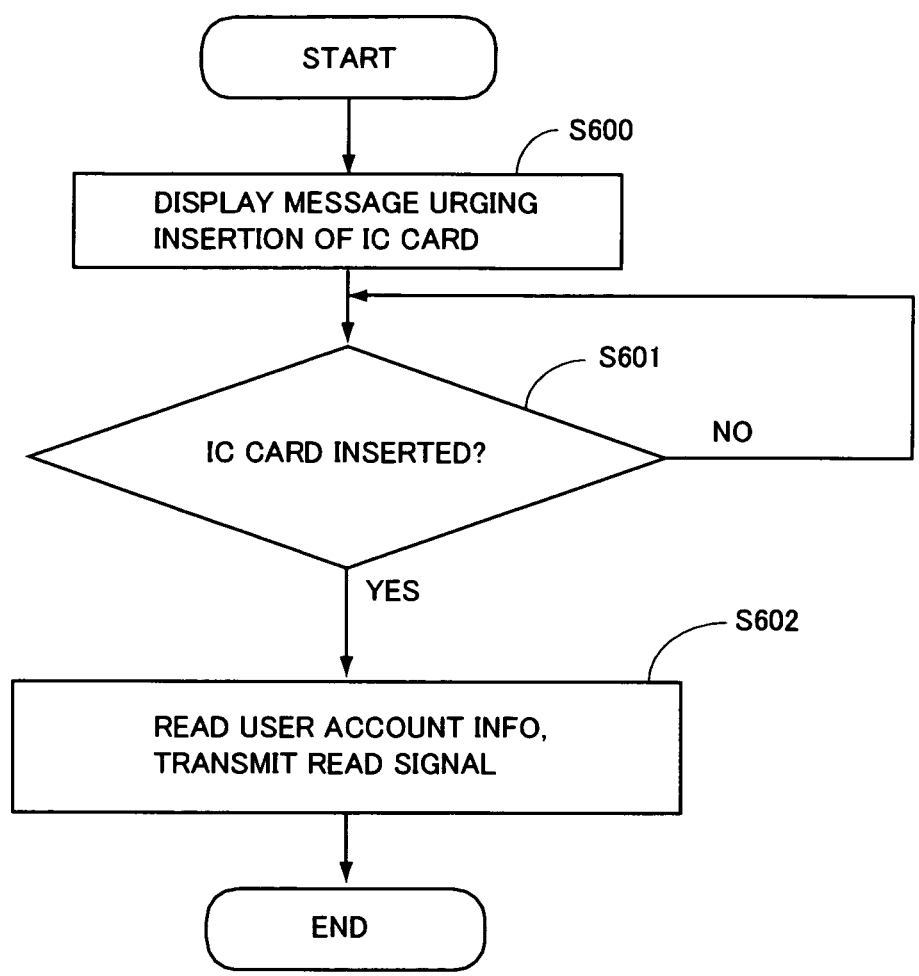
FIG. 11 shows, in the form of a flowchart, a program structure for realizing the authentication system in the information terminal.

Referring to FIG. 11, the transmission program is activated when a user authorized to execute the program turns on the power of information terminal 206 (208) and performs prescribed authentication using, for example, a password.

The program includes: a step 600 of displaying a message asking insertion of IC card 12 to a card insertion slot (not shown) of IC card reader 202 (204), such as "Insert Card", on the display unit of operation unit 314; and a step 601 of monitoring IC card reader 202 (204) and waiting until IC card 12 having user account information as the object of registration recorded thereon is inserted to the card insertion slot (not shown) of IC card reader 202 (204).

The program further includes a step 602, executed if it is determined at step 601 that IC card 12 has been inserted (YES), of causing IC card reader 202 (204) to read the user account information included in IC card 12 held by a registered user in accordance with a preset IC card standard, and to transmit the read signal including the read information to information processing device 24 through LAN I/F 318 and network 20.

<Operation>

Image forming apparatuses 22A to 22D, information processing device 24 and information terminal 206 (208) in accordance with the present embodiment operate in the following manner. The operations of the present embodiment are the same as those of the first embodiment described above except for the operation of information terminal 206 (208) and the operation of storing user account information of registered users by information processing device 24 to HDD 112. In the following, different operations will be described.

When a user authorized to execute the transmission program turns on the power of information terminal 206 (208) and performs prescribed authentication using, for example, a password, CPU 322 of control unit 300 of information terminal 206 (208) displays a message such as "Insert card" on the display unit of operation unit 314, asking insertion of IC card 12 to the card insertion slot (not shown) of IC card reader 202 (204).

When a registered user allowed to use image forming apparatus 22A or 22C inserts IC card 12 having the user account information as an object of registration recorded thereon to the card insertion slot (not shown) of IC card reader 202 (204) and CPU 322 of control unit 300 of information terminal 206 (208) determines that IC card 12 has been inserted to card insertion slot (not shown) of IC card reader 202 (204), IC card reader 202 (204) reads the user account included in IC card 12, in accordance with Type-A as the preset IC card standard. Then, it outputs a read signal including the read information to control unit 300 of information terminal 206 (208).

CPU 322 of control unit 300 of information terminal 206 (208) transmits the read signal output from IC card reader 202 (204) to information processing device 24 through LAN I/F 318 and network 20.

The power of information processing device 24 is always on, and when a user of information processing device 24 performs an input operation in accordance with an instruction to start the program for realizing authentication system 200 as described above through operating unit 114 of information processing device 24, CPU 122 of control unit 100 of information processing device 24 starts monitoring of LAN I/F 118.

Determining that LAN I/F 118 has received the read signal transmitted from information terminal 206 (208), CPU 122 of control unit 100 of information processing device 24 stores the user account information of a registered user included in the read signal in HDD 112. At this time, if the user account information of registered users has already been stored in HDD 112, the information included in the received read signal is stored to be newly added to the already stored user account information of registered users.

After having the user account information of a registered user included in the received read signal stored in HDD 112, CPU 122 of control unit 100 of information processing device 24 performs various processes including the process of transmitting the search request signal and the process of transmitting the user account information of registered users, in the similar manner as operations in accordance with the first embodiment.

CPU 70 of control unit 50 of each of image forming apparatuses 22A and 22C performs prescribed processes including the authentication process, in the similar manner as image forming apparatuses 22A and 22C in accordance with the first embodiment.

Thereafter, every time user account information of a registered user is additionally stored in HDD 112 of information processing device 24, the above-described operations are repeated until the power of information processing device 24 is turned off by the user.

As described above, in authentication system 200 additionally including information terminal 206 (208) performing data communication with the plurality of image forming apparatuses 22 and information processing device 24 through network 20, LAN I/F 318 of information terminal 206 (208) transmits the user account information of registered users to information processing device 24. In information processing device 24, LAN I/F 118 receives the user account information of the registered user transmitted from information terminal 206 (208), and HDD 112 stores the received user account information of the registered user.

Consequently, it becomes possible for information processing device 24 to obtain the user account information of a registered user from information terminal 206 (208) as an external device performing data communication through network 20 and, therefore, the process for storing and changing user account information of registered users becomes easier. Thus, it becomes more convenient for the user.

Authentication system 200 described above is configured such that every time information processing device 24 newly receives the user account information of a registered user, extracting process by extracting unit 120 is performed. The present invention, however, is not limited to such an embodiment. By way of example, a configuration may be adopted in which identification ID of image forming apparatus 22 extracted by extracting unit 120 is stored in HDD 112, the identification ID stored in HDD 112 is read every time information processing device 24 newly receives the user account information of a registered user, and the newly stored user account information of registered users may be transmitted to the image forming apparatus 22 that corresponds to the read identification ID.

(Functions/Effects)

The embodiments of the present invention provide authentication systems 10 and 200 including a plurality of image forming apparatuses 22 and information processing device 24 performing data communication with the plurality of image forming apparatuses 22 through network 20. In information processing device 24 of the systems, HDD 112 stores the user account information of registered users as the identification information for identifying whether or not the user is a registered user; control unit 100 and LAN I/F 118 inquire whether or not IC card reader 14 for reading the user account information from IC card 12 is connected by transmitting a search request signal to each of the plurality of image forming apparatuses 22; LAN I/F 118 receives reply signals transmitted in response to the inquiry from the plurality of image forming apparatuses 22; extracting unit 120 extracts an image forming apparatus 22 to which IC card reader 14 is connected from the plurality of image forming apparatuses 22 based on the received reply signals; and LAN I/F 118 transmits the user account information of registered users stored in HDD 112 to the extracted image forming apparatus 22.

In at least one of the plurality of image forming apparatuses 22, LAN I/F 66 receives the search request signal as the inquiry transmitted from information processing device 24; search request replying unit 16 and LAN I/F 66 determine whether or not IC card reader 14 is connected to the image forming apparatus 22 in response to reception by LAN I/F 66 of the search request signal, form a reply signal in accordance with the result of determination and transmit it to information processing device 24; if it is determined that IC card reader 14 is connected to the image forming apparatus 22, LAN I/F 66 and control unit 50 receive the user account information of registered users transmitted from information processing device 24 and store the information in HDD 52; and control unit 50 performs an authentication process for determining whether or not the user is a registered user, based on the user account information of registered users stored in HDD 52 and on the user account information read by IC card reader 14, and sets the image forming apparatus 22 to a state ready to use, depending on the result of determination.

As described above, information processing device 24 capable of data communication with a plurality of image forming apparatuses 22 extracts an image forming apparatus 22 having IC card reader 14 connected thereto from the plurality of image forming apparatuses 22 based on the reply signals transmitted from the plurality of image forming apparatuses 22 as response signals to the search request signal inquiring whether IC card reader 14 is connected or not, and transmits the user account information of registered users to the extracted image forming apparatus 22. Image forming apparatus 22 connectable to IC card reader 14 performs, if it is determined that IC card reader 14 is connected to the image forming apparatus 22, the authentication process based on the user account information of registered users received from information processing device 24 and stored in HDD 52 and on the information read by IC card reader 14. Therefore, as compared with an approach in which the user account information of registered users is transmitted to every image forming apparatus 22 performing data communication through network 20, the number of destinations for transmitting information can be reduced and hence, load required for the transmission process of information processing device 24 can be reduced. Further, it is possible to have the user account information of registered users received at one time by all image forming apparatuses 22 to which IC card readers 14 are connected. Therefore, as regards the image forming apparatuses 22 to which IC card readers 14 are connected, it becomes unnecessary for the user to have the user account information of registered users stored in advance in each and every image forming apparatus 22. Thus, the trouble required for the storing process can be saved. Further, as the image forming apparatus 22 performs the authentication process, even when data communication fails between image forming apparatus 22 and information processing device 24 because of some communication trouble or the like, stable authentication process is possible.

Further, according to the embodiments of the invention, LAN I/F 118 transmits the user account information of registered users stored in HDD 112 only to the image forming apparatus 22 extracted by extracting unit 120, among the plurality of image forming apparatuses 22. Therefore, as compared with an approach in which the user account information of registered users is transmitted to every image forming apparatus 22 performing data communication through network 20, the number of destinations for transmitting information can more reliably be reduced and hence, load required for the transmission process of information processing device 24 can more reliably be reduced.

Further, according to the embodiments of the invention, in image forming apparatus 22 connectable to IC card reader 14 reading user account information from IC card 12 and performing data communication with information processing device 24 through network 20, LAN I/F 66 receives the search request signal inquiring whether or not IC card reader 14 is connected to image forming apparatus 22, transmitted from information processing device 24; search request replying unit 16 and LAN I/F 66 determine, in response to reception of the search request signal by LAN I/F 66, whether or not IC card reader 14 is connected to the image forming apparatus 22, form reply signal in accordance with the result of determination and transmit the signal to information processing device 24; LAN I/F 66 and control unit 50 receive, if it is determined that IC card reader 14 is connected to the image forming apparatus 22, the user account information of registered users transmitted from information processing device 24 in response to the reply signal and store the information in HDD 52; control unit 50 performs, if it is determined that IC card reader 14 is connected to the image forming apparatus 22, the authentication process for determining whether or not the user is a registered user, based on the user account information of registered users stored in HDD 52 and on the user account information read by IC card reader 14, and sets the image forming apparatus 22 to a state ready to use, depending on the result of determination.

As described above, the image forming apparatus 22 connectable to IC card reader 14 performs, if it is determined that IC card reader 14 is connected to the image forming apparatus 22, the authentication process based on the user account information of registered users received from information processing device 24 and stored in HDD 52 and on the user account information read by IC card reader 14. Therefore, even if data communication between image forming apparatus 22 and information processing device 24 is impossible because of a communication trouble or the like, stable authentication process is possible. Further, it is possible to have the user account information of registered users received at one time by all image forming apparatuses 22 to which IC card readers 14 are connected. Therefore, as regards the image forming apparatuses 22 to which IC card readers 14 are connected, it becomes unnecessary for the user to have the user account information of registered users stored in advance in each and every image forming apparatus 22. Thus, the trouble required for storing information can be saved.

Further, according to the embodiments of the invention, in information processing device 24 performing data communication through network 20 with a plurality of image forming apparatuses 22 including an image forming apparatus 22 to which IC card reader 14 for reading user account information from IC card 12 is connected, HDD 112 stores the user account information of registered users as identification information for identifying whether or not the user is a registered user; control unit 100 and LAN I/F 118 inquire whether or not the IC card reader 14 for reading the user account information from IC card 12 is connected by transmitting the search request signal to each of the plurality of image forming apparatuses 22; LAN I/F 118 receives reply signals transmitted in response to the inquiry from the plurality of image forming apparatuses 22; extracting unit 120 extracts the image forming apparatus 22 to which IC card reader 14 is connected from the plurality of image forming apparatuses 22 based on the received reply signals; and LAN I/F 118 transmits the user account information of registered users stored in HDD 112 to the extracted image forming apparatus 22.

In this manner, information processing device 24 capable of data communication with the plurality of image forming apparatuses 22 extracts the image forming apparatus 22 to which IC card reader 14 is connected, from the plurality of image forming apparatuses 22 based on the reply signals transmitted from the plurality of image forming apparatuses 22, and transmits the user account information of registered users to the extracted image forming apparatus 22. Therefore, as compared with an approach in which the user account information of registered users is transmitted to every image forming apparatus 22 performing data communication through network 20, the number of destinations for transmitting information can be reduced and hence, load required for the transmission process of information processing device 24 can be reduced. Further, is it possible to have the user account information of registered users received at one time by all image forming apparatuses 22 to which IC card readers 14 are connected. Therefore, as regards the image forming apparatuses 22 to which IC card readers 14 are connected, it becomes unnecessary for the user to have the user account information of registered users stored in advance in every image forming apparatus 22. Thus, the trouble required for the information storing process can be saved.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An authentication system including a plurality of terminals and an information processing device performing data communication with said plurality of terminals through a network, wherein
said information processing device includes:
a storage unit configured to store identification information for identifying whether or not a user is a registered user,
an inquiring unit making an inquiry to each of said plurality of terminals about whether or not an information reading device for reading information from an information storage medium is connected to said each of said plurality of terminals,
a reply signal receiving unit receiving reply signals from said plurality of terminals, said reply signals being transmitted in response to said inquiry,
a processor configured to extract a terminal to which said information reading device is connected, from said plurality of terminals, in response to receiving reply signals from that extracted terminal, and
a first identification information transmitting unit transmitting said identification information stored in said storage unit only to said terminal extracted by said processor, among said plurality of terminals; and
at least one of said plurality of terminals includes:
an inquiry receiving unit receiving said inquiry transmitted from said information processing device,
a reply signal transmitting unit, responsive to reception of said inquiry by said inquiry receiving unit, for determining whether or not said information reading device is connected to said terminal, forming said reply signal in accordance with the result of determination and transmitting the signal to said information processing device,
a first identification information receiving unit receiving and storing in a prescribed identification information storage unit, said identification information transmitted from said information processing device, if it is determined that said information reading device is connected to the terminal,
a determining unit determining whether or not the user is a registered user, based on said identification information stored in said identification information storage unit and on said information read by said information reading device, and
a computer performing a prescribed process based on a result of determination by said determining unit,
wherein said information processing device further includes an elapsed time determining unit determining whether or not a predetermined prescribed time period has passed from transmission of said identification information;
wherein at least one of said plurality of terminals further includes a distribution acknowledgment signal transmitting unit transmitting a distribution acknowledgment signal, notifying successful reception of said identification information, to said information processing device;
said information processing device further includes a distribution acknowledgment signal receiving unit receiving said distribution acknowledgment signal; and
said first identification information transmitting unit includes a first re-transmitting unit for re-transmitting, if it is determined by said elapsed time determining unit that the predetermined prescribed time period has passed from transmission of said identification information, said identification information stored in said storage unit to said extracted terminal that has not yet transmitted said distribution acknowledgment signal, and
said storage unit includes a distribution log information storage unit for further storing distribution destination information indicating a terminal as a transmission destination of said identification information, distribution date and time information indicating date and time of transmission of said identification information, and distribution status information indicating whether or not said terminal has successfully received the identification information, related to each other as distribution log information.

2. The authentication system according to claim 1, wherein in said information reading device, a prescribed reading method for reading information from said information recording medium is set in advance;

said inquiring unit includes a method inquiring unit for making an inquiry to each of said plurality of terminals about whether or not an information reading device reading information from said information recording medium in accordance with the prescribed reading method is connected to said each of said plurality of terminals; and said reply signal transmitting unit includes a transmitting unit, responsive to reception of said inquiry by said inquiry receiving unit, for determining whether or not said information reading device reading information from said information recording medium in accordance with said prescribed reading method is connected to said terminal, forming said reply signal in accordance with the result of determination and transmitting the signal to said information processing device.

3. The authentication system according to claim 1, wherein said first identification information transmitting unit further includes a second re-transmitting unit for re-transmitting, if it is determined by said elapsed time determining unit that the predetermined prescribed time period has passed from transmission of said identification information, said identification information stored in said storage unit to said extracted terminal.

4. The authentication system according to claim 1, further comprising an information terminal performing data communication with said plurality of terminals and said information processing device through a network; wherein said information terminal includes a second identification information transmitting unit transmitting said identification information to said information processing device;

said information processing device further includes a second identification information receiving unit receiving said identification information transmitted from said information terminal; and said storage unit stores said identification information received by said second identification information receiving unit.

5. The authentication system according to claim 1, further comprising an information terminal performing data communication with said plurality of terminals and said information processing device through a network; wherein said information terminal includes a second identification information transmitting unit transmitting said identification information to said information processing device;

said information processing device further includes a second identification information receiving unit receiving said identification information transmitted from said information terminal; and said storage unit stores said identification information received by said second identification information receiving unit.

6. The authentication system according to claim 2, further comprising an information terminal performing data communication with said plurality of terminals and said information processing device through a network; wherein said information terminal includes a second identification information transmitting unit transmitting said identification information to said information processing device;

said information processing device further includes a second identification information receiving unit receiving said identification information transmitted from said information terminal; and said storage unit stores said identification information received by said second identification information receiving unit.

7. The authentication system according to claim 3, further comprising an information terminal performing data communication with said plurality of terminals and said information processing device through a network; wherein said information terminal includes a second identification information transmitting unit transmitting said identification information to said information processing device;

said information processing device further includes a second identification information receiving unit receiving said identification information transmitted from said information terminal; and said storage unit stores said identification information received by said second identification information receiving unit.

8. The authentication system according to claim 1, further comprising an information terminal performing data communication with said plurality of terminals and said information processing device through a network; wherein said information terminal includes a second identification information transmitting unit transmitting said identification information to said information processing device;

said information processing device further includes a second identification information receiving unit receiving said identification information transmitted from said information terminal; and said storage unit stores said identification information received by said second identification information receiving unit.

9. The authentication system according to claim 1, further comprising an information terminal performing data communication with said plurality of terminals and said information processing device through a network; wherein said information terminal includes a second identification information transmitting unit transmitting said identification information to said information processing device;

said information processing device further includes a second identification information receiving unit receiving said identification information transmitted from said information terminal; and said storage unit stores said identification information received by said second identification information receiving unit.

* * * * *